United States Patent
Tokuchi

(10) Patent No.: US 10,491,775 B2
(45) Date of Patent: Nov. 26, 2019

(54) INFORMATION PROCESSING APPARATUS, NON-TRANSITORY COMPUTER READABLE MEDIUM, AND INFORMATION PROCESSING METHOD

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/009,217

(22) Filed: Jun. 15, 2018

(65) Prior Publication Data

US 2019/0166276 A1    May 30, 2019

(30) Foreign Application Priority Data

Nov. 27, 2017  (JP) .................. 2017-226685

(51) Int. Cl.
*H04N 1/00* (2006.01)
*G06F 3/12* (2006.01)

(52) U.S. Cl.
CPC ....... *H04N 1/00952* (2013.01); *G06F 3/1204* (2013.01); *G06F 3/1207* (2013.01); *G06F 3/1259* (2013.01)

(58) Field of Classification Search
CPC . H04N 1/00952; G06F 3/1204; G06F 3/1207; G06F 3/1259
USPC ...................................................... 358/1.15
See application file for complete search history.

(56) References Cited

U.S. PATENT DOCUMENTS

| | | | | |
|---|---|---|---|---|
| 7,039,867 | B1* | 5/2006 | Scheidig | G06F 3/033 358/1.13 |
| 8,959,564 | B2* | 2/2015 | Thompson | H04N 5/445 348/584 |
| 9,357,088 | B2* | 5/2016 | Kuroyanagi | H04N 1/00453 |
| 2003/0046345 | A1* | 3/2003 | Wada | G06Q 10/06 709/205 |
| 2008/0024818 | A1* | 1/2008 | Ito | G06F 3/1204 358/1.15 |
| 2010/0211951 | A1 | 8/2010 | Ito | |
| 2011/0211227 | A1 | 9/2011 | Sato | |
| 2014/0203922 | A1* | 7/2014 | Marshall | G08C 17/02 340/12.5 |
| 2016/0094754 | A1* | 3/2016 | Miyazawa | H04N 1/32475 358/1.13 |
| 2017/0278486 | A1* | 9/2017 | Ishikawa | G06F 3/048 |

FOREIGN PATENT DOCUMENTS

| | | |
|---|---|---|
| JP | 2010187199 | 8/2010 |
| JP | 2011166748 | 8/2011 |

* cited by examiner

*Primary Examiner* — Allen H Nguyen
(74) *Attorney, Agent, or Firm* — JCIPRNET

(57) ABSTRACT

An information processing apparatus includes: an accepting unit that accepts components required for a coordinated function; and a controller that controls notification of an executable coordinated function according to contents accepted by the accepting unit. In a further modification of the invention, the controller may control notification of at least one of a coordinated function executable with the components or a coordinated function executable with similar components that are similar to the components.

11 Claims, 19 Drawing Sheets

FIG.3

< COORDINATED FUNCTION MANAGEMENT TABLE >

| COORDINATED FUNCTION ID | DEVICE (WHOLE, PART) | SOFTWARE | TARGET | CONTENTS |
|---|---|---|---|---|
| COORDINATED FUNCTION 1 | •MULTIFUNCTION MACHINE (SCANNER) α | •OCR SOFTWARE •LEDGER CREATION SOFTWARE | •ACCOUNTING FILE A (FIXED ASSET SECTION) | ADD READ IMAGE TO FIXED ASSET SECTION OF ACCOUNTING FILE A |
| COORDINATED FUNCTION 2 | | •WEB BROWSER •SHOPPING SITE •PURCHASE INSTRUCTION | •DESIGNER BAG B (SHOPPING TARGET) | PURCHASE WHEN DESIGNER BAG B IS PRESENTED ON SHOPPING SITE |
| COORDINATED FUNCTION 3 | | •PRESENTATION SOFTWARE | •PHOTOGRAPHIC IMAGE C •PRESENTATION FILE D | INSERT PHOTOGRAPHIC IMAGE C INTO PRESENTATION FILE D |
| COORDINATED FUNCTION 4 | | •DOCUMENT CREATION SOFTWARE •LEDGER CREATION SOFTWARE | •DOCUMENT FILE E •ACCOUNTING FILE A | INSERT CONTENTS OF DOCUMENT FILE E INTO ACCOUNDING FILE A |
| COORDINATED FUNCTION 5 | •TELEPHONE | •DOCUMENT CREATION SOFTWARE | | SAVE CONVERSATION CONTENTS AS DOCUMENT |
| COORDINATED FUNCTION 6 | •DOOR OPENING/CLOSING SENSOR •SECURITY CAMERA | •NOTIFICATION SOFTWARE | | SHOOT WITH SECURITY CAMERA AT CORRESPONDING PLACE AND NOTIFY USER OF DETECTION RESULT ACCORDING TO OPENING/CLOSING OF DOOR |
| ... | ... | ... | ... | ... |

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2017-226685 filed Nov. 27, 2017.

BACKGROUND

Technical Field

The present invention relates to an information processing apparatus, a non-transitory computer readable medium, and an information processing method.

SUMMARY

According to an aspect of the invention, an information processing apparatus includes: an accepting unit that accepts components required for a coordinated function; and a controller that controls notification of an executable coordinated function according to contents accepted by the accepting unit.

BRIEF DESCRIPTION OF THE DRAWINGS

Exemplary embodiments of the present invention will be described in detail based on the following figures, wherein:

FIG. 3 is a view illustrating a coordinated function management table;

DETAILED DESCRIPTION

Figure 1:
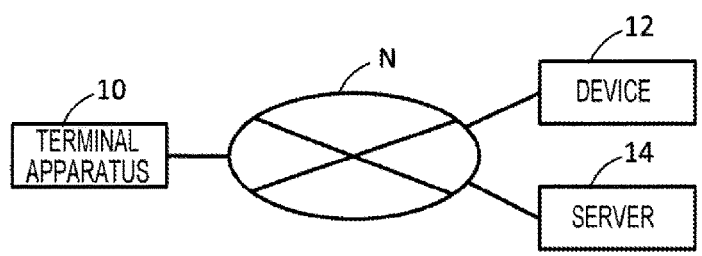
FIG. 1 is a block diagram illustrating a configuration of an information processing system according to an exemplary embodiment of the present invention.

With reference to FIG. 1, an information processing system according to an exemplary embodiment of the present invention will be described. FIG. 1 illustrates an example of an information processing system according to the present exemplary embodiment.

The information processing system according to the present exemplary embodiment, as an example, includes a terminal device 10, a device 12, and a server 14. In the example illustrated in FIG. 1, the terminal device 10, the device 12, and the server 14 have a function of communicating with each other through a communication path N such as a network. The terminal device 10, the device 12, and the server 14 may communicate with each other through different communication paths, rather than using the communication path N, or may directly communicate with each other. Plural terminal devices 10, plural devices 12, or plural servers 14 may be included in the information processing system, or the device 12 or the server 14 may not be included in the information processing system.

The terminal device 10 is a device such as a personal computer (PC), a tablet PC, a smart phone, or a mobile phone, and has a function of transmitting and receiving data to/from other devices. The terminal device 10 may be a wearable terminal (e.g., a wristwatch-type terminal, a wristband-type terminal, a spectacle-type terminal, a ring-type terminal, a contact lens-type terminal, an intracorporeal implanting-type terminal, or a hearable terminal). The terminal device 10 may include a flexible display as a display device. As for the flexible display, for example, an organic electroluminescence-type display (a flexible organic EL display), an electronic paper-type display, or a flexible liquid crystal display may be used. Flexible displays employing display methods other than these may be used. The flexible display is a display in which a display portion is flexibly deformable, and is, for example, a display that can be bent, folded, rolled, twisted, or stretched. The entire terminal device 10 may include a flexible display, or the flexible display and other components may be functionally or physically separated from each other.

The device 12 is a device having a function such as, for example, a device such as an image forming device having an image forming function (e.g., a scanning function, a printing function, a copying function, or a facsimile function), a PC, a tablet PC, a smart phone, a mobile phone, a robot (e.g., a humanoid robot, a non-human animal type robot, a robot other than these), a projector, a display device such as a liquid crystal display, a recording device, a reproduction device, an image capturing device such as a camera, a refrigerator, a rice cooker, a microwave oven, a coffee maker, a cleaner, a washing machine, an air conditioner, a lighting apparatus, a watch, a surveillance camera, an automobile, a motorcycle, an aircraft (e.g., an unmanned aerial vehicle (a so-called drone)), a game machine, various sensing devices (e.g., a temperature sensor, a humidity sensor, a voltage sensor, or a current sensor). The device 12 may be a device that outputs an output to a user (e.g., an image forming device or a PC), or a device that does not output an output to a user (e.g., a sensing device). Among plural devices executing a coordinated function to be described later, all devices may be devices that output an output to a user, some devices may be devices that output an output to a user, and other devices may be devices that do not output an output to a user, or all devices may be devices that do not output an output to a user. The conceptual category of the device 12 may include most of devices. For example, information equipment, video equipment, audio equipment, and other equipment may be included in the category of the device according to the present exemplary embodiment. The device 12 has a function of transmitting and receiving data to/from other devices.

The server 14 is a device that performs, for example, a management of data or user information and a management of the device 12. The server 14 has a function of transmitting and receiving data to/from other devices.

Figure 2:
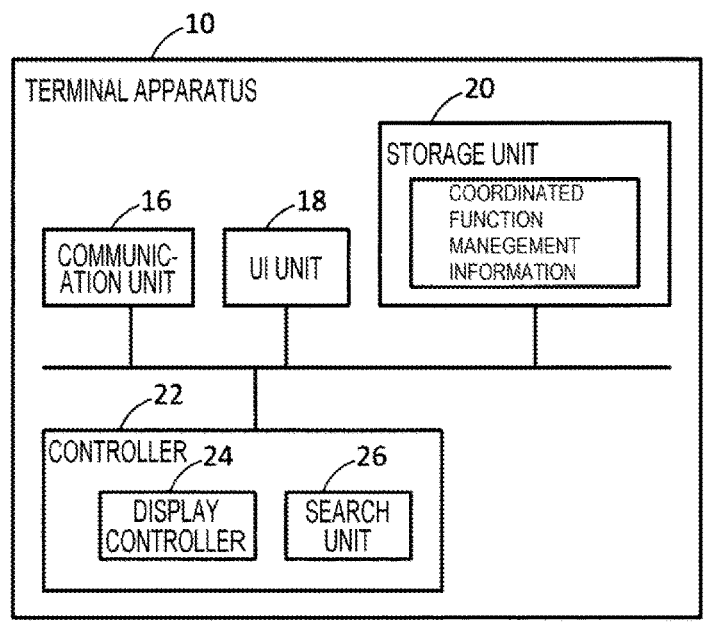
FIG. 2 is a block diagram illustrating a configuration of a terminal device.

Hereinafter, with reference to FIG. 2, the configuration of the terminal device 10 will be described in detail.

A communication unit 16 is a communication interface, and has a function of transmitting data to other devices, and a function of receiving data from other devices. The communication unit 16 may be a communication interface having a wireless communication function, or a communication interface having a wired communication function. The communication unit 16 corresponds to, for example, one or plural types of communication methods, and may communicate with a communication partner according to a communication method (that is, a communication method corresponding to the communication partner) suitable for the communication partner. The communication method is, for example, infrared communication, visible light communication, Wi-Fi (registered trademark) communication, or close proximity wireless communication (e.g., near field communication (NFC))). As for the close proximity wireless communication, for example, Felica (registered trademark), Bluetooth (registered trademark), or radio frequency identifier (RFID) is used. In addition, another type of wireless communication may be used as the close proximity wireless communication. The communication unit 16 may switch a communication method or a frequency band according to the communication partner, or switch a communication method or a frequency band according to a surrounding environment.

A UI unit 18 is a user interface unit, and includes a display and an operation unit. The display is, for example, a display device such as a liquid crystal display. The display may be a flexible display. The operation unit is, for example, an input device such as a touch panel or a keyboard. A user interface serving as both a display and an operation unit (including, for example, a touch-type display or a device electronically displaying a keyboard or the like on a display) may be employed. The UI unit 18 may include a sound collector such as a microphone or an audio generator such as a speaker. In this case, information may be input to the terminal device 10 by voice input, or information may be generated by voice.

A storage unit 20 is a storage device such as a hard disk or a memory (e.g., a SSD). The storage unit 20 stores, for example, coordinated function management information, various data, various programs (e.g., an operating system (OS), and various application programs (application software)), information indicating an address of another device (e.g., the device 12) (device address information), information indicating an address of the server 14 (server address information), and information related to a coordinated function. These may be stored in separate storage devices, or stored in one storage device.

Hereinafter, coordinated function management information will be described in detail. The coordinated function management information is information used for managing a coordinated function that is executable by using components (e.g., a device, a function, and a target). The function as a component may be a function included in a device as hardware or a function implemented by software. The target as a component is, for example, data or a physical object to which a coordinated function is applied.

The coordinated function is, for example, a function that can be executed using plural components. For example, one or plural coordinated functions are executed by coordinating plural components. The coordinated function may be a function that can be executed using plural functions of a single device or a single piece of software. Also in this case, plural functions are used, and thus, the coordinated function is considered to be a function that can be executed using plural components. The terminal device 10 that issues an operation instruction may also be used as a target device for coordination, and a function of the terminal device 10 may also be used as a part of the coordinated function.

The component may be an entire device, a specific portion of a device, software, a specific function of software, a collective function including plural functions, or a target. For example, when a function is allocated to each portion of a device, the coordinated function may be a function executed using the portion. When a piece of software has plural functions, the coordinated function may be a function executed using a part of the plural functions. The collective function includes plural functions, and the plural functions are simultaneously or sequentially executed so that the processing by the collective function is executed. The coordinated function may be a function executed using only hardware, a function executed using only software, or a function executed using hardware and software.

The coordinated function management information is, for example, information indicating the correspondence between a combination of plural components used for the coordinated function (a combination of pieces of component information for identifying respective components) and coordinated function information on the coordinated function.

When a component is a device, the component information is device identification information for identifying the device. When a component is software, the component information is software identification information for identifying the software. When a component is a target, the component information is target identification information for identifying the target. When a component is a device, the component information may include function information indicating a function of the device. Likewise, when a component is software, the component information may include function information indicating the function of the software.

Device identification information is, for example, a device name, a device ID, information indicating a device type, the model number of a device, information for managing a device (e.g., asset management information), information indicating a location where a device is provided (device position information), an image associated with a device (a device image), or device address information. The device image is, for example, an appearance image representing a device. The appearance image may be an image representing the outside of a device (e.g., a casing of the device), an image representing a state where a casing is opened and the inside is visible from the outside (e.g., an internal structure), or an image representing a state where the device is covered with a packaging sheet. The device image may be an image generated by capturing a device (e.g., an image representing an appearance of the device or an image representing the inside), or an image schematically representing the device (e.g., an icon). The device image may be a still image, or a moving image. Data of the device image may be stored in the storage unit 20, or stored in an external device such as the device 12 or the server 14.

Software identification information is, for example, a software name, a software ID, information indicating a software type, a model number of software, information for managing software, or an image associated with software (a software image). The software image is, for example, an image representing a function of software (e.g., an icon). The software image may be a still image or a moving image.

Data of the software image may be stored in the storage unit 20, or stored in an external device such as the device 12 or the server 14.

Target identification information is, for example, a target name, a target ID, information indicating a target type, or an image associated with a target (a target image). For example, when a target is data (e.g., image data or document data), for example, a name of the data is used as the target identification information. When a target is a physical object (e.g., an article), for example, a name of the object is used as the target identification information. The target image may be an image generated by capturing a physical target (a still image or a moving image), or an image schematically representing a target (e.g., an icon). Data of the target image may be stored in the storage unit 20, or stored in an external device such as the device 12 or the server 14.

Coordinated function information includes, for example, identification information such as a name or an ID of a coordinated function, and content information indicating contents of a coordinated function.

The coordinated function may be a function that can be executed by coordinating plural components different from one another, or a function that can be executed by coordinating the same components. The coordinated function may also be a function that is not available before the coordination. For example, a device having a printing function (a printer) may be coordinated with a device having a scanning function (a scanner) so that a copying function as the coordinated function is executable. That is, the printing function and the scanning function may be coordinated with each other so that the copying function is executable. In this case, the copying function as the coordinated function is associated with a combination of the printing function and the scanning function. As to the coordinated function management information, for example, coordinated function information indicating the copying function as the coordinated function is associated with a combination of device identification information for identifying the device having the printing function and device identification information for identifying the device having the scanning function.

The concept of the coordinated function may also include an integrated function that can be executed as a new function by coordinating plural functions or plural devices. For example, plural displays may be combined to implement an extended display function as the integrated function. As another example, a television and a recorder may be combined to implement a video recording function as the integrated function. The video recording function may also be the function of recording images displayed on the television. Plural cameras may also be combined to implement an imaging range extension function as the integrated function. The extension function is, for example, the function of imaging based on joining of imaging areas of respective cameras. A telephone may be combined with a translation machine or translation software to implement a call translation function (a function of translating conversation via the telephone) as the integrated function. As described above, the concept of the coordinated function includes a function that can be implemented by coordinating devices or functions of the same type, or a function that can be implemented by coordinating devices or functions of different types.

The coordinated function management information may be stored in the server 14. In this case, the coordinated function management information may not be stored in the storage unit 20. The coordinated function management information may be stored in the device 12.

The controller 22 has a function of controlling operations of respective units of the terminal device 10. For example, the controller 22 performs execution of various programs, a control of a communication by the communication unit 16, a control of an information notification using the UI unit 18 (e.g., display of information or voice output), and acceptance of information input using the UI unit 18. The controller 22 functions as an accepting unit to accept components required for a coordinated function. The components are, for example, input to the terminal device 10 by a user using the UI unit 18. The controller 22 includes a display controller 24 and a search unit 26.

The display controller 24 has the function of causing a display of the UI unit 18 to display various pieces of information. For example, the display controller 24 causes the display to display a component-associated image, a coordinated function-associated image, or the like. The display controller 24 causes the display to display the result of search by the search unit 26 (to be described later).

The search unit 26 searches for a coordinated function executable according to contents (e.g., components) accepted by the controller 22 functioning as an accepting unit. For example, the search unit 26 searches for a coordinated function executable with components accepted by the controller 22 by referring to a database in which plural components are associated with a coordinated function executable with the plural components in advance. The search unit 26 may search for a coordinated function executable with plural components including a component accepted by the controller 22, or search for a coordinated function executable with plural components completely matching plural components accepted by the controller 22. In the database, a combination of plural components (at least two components among a device, a specific portion of a device, software, a specific function of software, a collective function, and a target) is associated with a coordinated function executable with the plural components in advance, and the controller 22 searches for a coordinated function executable with components accepted by the controller 22 by referring to the correspondence. The database may be stored in the storage unit 20, or stored in the server 14. As the database, the above described coordinated function management information may be used. In a method other than the database, the search unit 26 may use an expression representing a correspondence between plural components and a coordinated function executable with the plural components in a function form to specify a coordinated function executable with components accepted by the controller 22.

The search unit 26 may search for a coordinated function executable with components (similar components) similar to components accepted by the controller 22. The similar component may be a component having a function similar to that of the component accepted by the controller 22, or a product or an article which has the same function as the component but is separate from the component. The similar function is a function equivalent to the function of the component, but may be, for example, a function having a performance different from that of the function of the component, or a function partially overlapping the function of the component.

For example, when a device as a component accepted by the controller 22 is a scanner that reads a document and generates image data, a scanner, which has the same performance (e.g., a resolution or a reading speed) as the scanner as the component but is a separate product from the component, corresponds to the similar component. A scanner having a different performance from the scanner as the component may correspond to the similar component. A multifunction machine (a device having an image forming function other than the scanning function (e.g., a printing function or a copying function)) having a scanning function may correspond to the similar component.

When software as a component accepted by the controller 22 is document creation software for creating a document, document creation software, which has exactly the same function as the document creation software as the component but is a separate product from the component, corresponds to the similar component. Document creation software having a document creation function but having a different performance from that of the document creation software as the component may correspond to the similar component. Software as a package including document creation software (e.g., integrated software including plural software pieces) may correspond to the similar component. When software as a component is a Web browser, a Web browser different from the Web browser as the component corresponds to the similar component.

The similar component may be a component compatible with a component accepted by the controller 22. For example, separate document creation software compatible with document creation software as the component may correspond to the similar component.

The search unit 26 may be provided in the server 14. In this case, information indicating components accepted by the controller 22 may be transmitted from the terminal device 10 to the server 14, a coordinated function may be searched for in the server 14, and information indicating the search result may be transmitted from the server 14 to the terminal device 10. In addition, even when the search unit 26 is provided in the server 14, the coordinated function may be searched for in the terminal device 10. When the search unit 26 is provided in the server 14, the search unit 26 may not be provided in the terminal device 10.

Hereinafter, the information processing system according to the present exemplary embodiment will be described in more detail.

With reference to FIG. 3, the coordinated function management information will be described in detail. FIG. 3 illustrates an example of a coordinated function management table as the coordinated function management information. In the coordinated function management table, as an example, a coordinated function ID, information indicating a component (a device, software, or a target), and information indicating the contents of a coordinated function are associated with each other. The whole or part of a device may be used as a component. A specific function of software may be used as a component. A component may be identified by superordinate concept level information (e.g., a common name or a generic name of the component), or identified by subordinate concept level information (e.g., a unique name of the component (e.g., a specific product name, an article name, a model number, a Web site name, or a URL)). Hereinafter, each coordinated function will be described in detail.

For example, a coordinated function 1 is a function executable by coordinating a multifunction machine α (a device having a scanning function) as a device, optical character recognition (OCR) software and ledger creation software as pieces of software, and an accounting file A (accounting data A) as a target for which the coordinated function 1 is to be used. The contents of the coordinated function 1 correspond to the function of "reading a document (e.g., a receipt) to produce an image (e.g., an image of the receipt), and adding the produced image to the fixed asset section of an accounting file A." Specifically, reading and imaging are performed by the multifunction machine α, a character string is extracted from the image by the OCR software, and the character string is added to the fixed asset section of the accounting file A by the ledger creation software. The multifunction machine as a device may be identified by a unique name indicating a specific multifunction machine (e.g., a product name α), or identified by a common name "multifunction machine." Likewise, the OCR software may be identified by a unique name indicating specific OCR software (e.g., a product name AAA), or identified by a common name "OCR software." Likewise, the ledger creation software may be identified by a unique name indicating specific ledger creation software (e.g., a product name BBB), or identified by a common name "ledger creation software." The accounting file as a target may be identified by a unique name indicating a specific accounting file (e.g., a file name A), or identified by a common name "accounting file."

When an instruction for execution of the coordinated function 1 is given, a processing defined by the contents of the coordinated function 1 is executed. When all the components are identified by subordinate concept levels, that is, unique names, the coordinated function 1 is executed using components identified by the unique names. For example, the multifunction machine α reads a document (e.g., a receipt) to produce an image, the OCR software AAA extracts a character string from the image (e.g., the image of the receipt), and the ledger creation software BBB adds the extracted character to the fixed asset section of the accounting file A. Meanwhile, when a component identified by a superordinate concept level, that is, a common name, is included, an instruction for execution of the coordinated function 1 is given, and then the display controller 24 causes a display to display information inquiring a user about the unique name of the component. For example, when the multifunction machine is identified by a common name, the display controller 24 causes the display to display information inquiring the user about the specific multifunction machine used for the execution of the coordinated function 1. In response, when the user specifies the specific multifunction machine (e.g., the multifunction machine α), the multifunction machine α and other components are used to execute the coordinated function 1.

A coordinated function 2 is a function that can be executed by coordinating a Web browser as software, a shopping site on the Internet, a purchase instruction, and a designer bag B as a target to each other. The contents of the coordinated function 2 correspond to the function of "running the Web browser and purchasing the designer bag B when the designer bag B is presented on the shopping site." Similarly to the coordinated function 1, the Web browser as software may be identified by a unique name indicating a specific Web browser (e.g., a product name CCC), or identified by a common name "Web browser." Likewise, the shopping site may be identified by a unique name indicating a specific shopping site (e.g., a site name DDD or its URL), or identified by a common name "shopping site." The designer bag as a target may be identified by a unique name indicating a specific designer bag (e.g., a designer bag B), or identified by a common name "designer bag" or "bag."

When an instruction for execution of the coordinated function 2 is given, a processing defined by the contents of the coordinated function 2 is executed. When all the components are identified by unique names, the coordinated function 2 is executed using components identified by the unique names. For example, when the Web browser CCC is run and the designer bag B is presented on the shopping site DDD, a processing for purchasing the designer bag B is executed. Meanwhile, when a component identified by a common name is included, an instruction for execution of the coordinated function 2 is given, and then the display controller 24 causes the display to display information inquiring the user about the unique name of the component. For example, when the shopping site is identified by a common name, the display controller 24 causes the display to display information inquiring the user about the specific shopping site. In response, when the user specifies the specific shopping site (e.g., the shopping site DDD), in the case where the designer bag B is presented on the shopping site DDD, the purchase processing is executed.

A coordinated function 3 is a function that can be executed by coordinating presentation software as software, and a photo image C and a presentation file D as targets. The contents of the coordinated function 3 correspond to the function of "inserting the photo image C into the presentation file D by the presentation software." Similarly to the coordinated function 1, the presentation software as software may be identified by a unique name indicating specific presentation software (e.g., a product name EEE), or identified by a common name "presentation software." The photo image as a target may be identified by a unique name indicating a specific photo image (e.g., a photo image C), or identified by a common name "photo image." This also applies to the presentation file.

When an instruction for execution of the coordinated function 3 is given, a processing defined by the contents of the coordinated function 3 is executed. When all the components are identified by unique names, the coordinated function 3 is executed using components identified by the unique names. For example, the photo image C is inserted into the presentation file D by the presentation software EEE. Meanwhile, when a component identified by a common name is included, an instruction for execution of the coordinated function 3 is given, and then the display controller 24 causes the display to display information inquiring the user about the unique name of the component. For example, when the presentation software is identified by a common name, the display controller 24 causes the display to display information inquiring the user about the specific presentation software. In response, when the user specifies the specific presentation software (e.g., the presentation software EEE), the photo image C is inserted into the presentation file D by the presentation software EEE.

A coordinated function 4 is a function that can be executed by coordinating document creation software and ledger creation software as pieces of software, and a document file E and an accounting file A as targets. The contents of the coordinated function 4 correspond to the function of "inserting the contents of the document file E into the accounting file A by the document creation software and ledger creation software." Similarly to the coordinated function 1, the document creation software as software may be identified by a unique name indicating specific document creation software (e.g., a product name FFF), or identified by a common name "document creation software." This also applies to the ledger creation software. The document file as a target may be identified by a unique name indicating a specific document file (e.g., a document file E), or identified by a common name "document file." This also applies to the accounting file.

When an instruction for execution of the coordinated function 4 is given, a processing defined by the contents of the coordinated function 4 is executed. When all the components are identified by unique names, the coordinated function 4 is executed using components identified by the unique names. For example, the contents of the document file E are copied or cut out by the document creation software FFF, and the contents are inserted into the accounting file A by the ledger creation software BBB. Meanwhile, when a component identified by a common name is included, an instruction for execution of the coordinated function 4 is given, and then the display controller 24 causes the display to display information inquiring the user about the unique name of the component. For example, when the document creation software is identified by a common name, the display controller 24 causes the display to display information inquiring the user about the specific document creation software. In response, when the user specifies the specific document creation software (e.g., the document creation software FFF), the contents of the document file E are copied or cut out by the document creation software FFF.

A coordinated function 5 is a function that can be executed by coordinating a telephone as a device, and document creation software as software. The contents of the coordinated function 5 correspond to the function of "saving, as a document, the contents of conversation made using a telephone." For the creation and saving of the document, the document creation software is used. Similarly to, for example, the coordinated function 1 described above, each of the telephone and the document creation software may be identified by a unique name, or identified by a common name.

A coordinated function 6 is a function that can be executed by coordinating a door sensor and a security camera as devices, and notification software as software. The contents of the coordinated function 6 correspond to the function of "shooting the place with the security camera in response to the opening and closing of the door and notifying a user of a detection result such as opening and closing." For the detection of the opening and closing of the door, an opening and closing sensor may be used, and for the notification of the detection result, notification software may be used. Similarly to, for example, the coordinated function 1 described above, each of the opening and closing sensor, the security camera, and the notification software may be identified by a unique name, or identified by a common name.

The coordinated functions illustrated in FIG. 3 are exemplary only, but coordinated functions other than these may be registered in the coordinated function management table. For example, the coordinated function may be a function executable with Internet of Things (IoT) devices. The coordinated function may be used at connected home (a system in which devices such as appliances are connected to each other via a network by using an IoT technology). In this case, the devices may be connected to each other through a specific server, or connected to each other not through a specific server. Plural components may also be coordinated via IFTTT to execute the coordinated function. That is, contents of the coordinated function may correspond to that when a trigger event occurs in a certain component, another component executes an action (a processing). For example, it can be said that the above described coordinated function 2 may be a function that the exhibition of the brand bag B triggers the execution of an action of purchasing the brand bag. The category of the coordinated function may also include a function that an action by a certain component becomes a separate trigger which causes another component to execute an action. The category of the coordinated function may also include the function of coordinating plural Web services and application programming interface (API) coordination in which, for example, plural systems or services are coordinated using API.

As a device, a portion of a device may be used. For example, when a device has plural functions, and functions are allocated to portions of the device, respectively, a coordinated function using the portions of the device may be defined. In description with a specific example, it is assumed that a printing function is allocated to a main body portion of a multifunction machine, a scanning function is allocated to a reading unit (e.g., a portion corresponding to a document cover, a document glass, or an automatic document feeding device) of the multifunction machine, and a post-processing function (e.g., a stapling function) is allocated to a post-processing device of the multifunction machine. When a scanning function is used in the coordinated function 1, a reading unit of the multifunction machine may be designated as a component required for the coordinated function 1. As software, a collection of functions gathered in a block unit, such as robotics process automation (RPA), may be used.

Coordinated functions registered in the coordinated function management table may be created and registered in advance, or created and registered by a user. The search unit 26 may search for a coordinated function executable by contents accepted by the controller 22 by referring to the coordinated function management table.

Devices registered in the coordinated function management table may be devices (e.g., the device 12) included in the information processing system, or may be devices not included in the information processing system. Software registered in the coordinated function management table may be software installed in the terminal device 10, or software installed in an external device such as the device 12 or the server 14.

The terminal device 10 may update the coordinated function management table at any timing, regularly, or at a timing specified by, for example, a user or a manager. When the coordinated function management table is stored in the external device such as the server 14, the coordinated function management table may be updated in the external device. Due to the update, a new coordinated function may be added to the coordinated function management table, contents or components of coordinated functions already registered in the coordinated function management table may be changed, or a coordinated function may be deleted from the coordinated function management table. For example, when a function of a device or software registered in the coordinated function management table is updated, the contents of a coordinated function using the updated function may be updated along with the update. A coordinated function may be made available with plural components which have not been able to be coordinated before the update, or conversely, a coordinated function available before the update may be made unavailable after the update.

Figure 4:
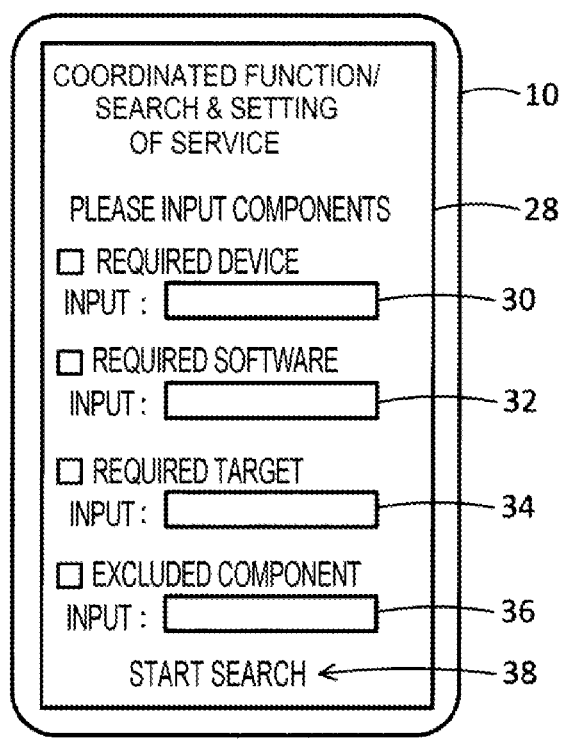
FIG. 4 is a view illustrating a screen.

Hereinafter, with reference to FIG. 4, a screen displayed when a coordinated function is searched for will be described in detail. FIG. 4 illustrates a screen 28. The screen 28 is a screen on which search conditions for searching for a coordinated function are input. According to the user's instruction displayed on the screen 28, the display controller 24 causes the display of the UI unit 18 to display the screen 28 and to display, on the screen 28, input fields to which components are input as search conditions. On the screen 28, for example, input fields 30, 32, 34, and 36 are displayed.

The input field 30 is a field to which a device as a component used for a coordinated function is input. The input field 32 is a field to which software as a component used for the coordinated function is input. The input field 34 is a field to which a target as a component used for the coordinated function is input. The input field 36 is a field to which an excludable component not for use for the coordinated function is input. The user may directly input a component to each input field using the UI unit 18, or select a component from a component list displayed in a pull-down format in each input field. The controller 22 accepts each component input to each input field. The user may input components to all input fields, or may input components to some input fields, and may not input components to other input fields. The user may input a component to only one input field or input components to plural input fields. The user may input only one component or plural components to one input field. As information indicating a component, a unique name of the component may be input, or a common name of the component may be input.

When a search start button 38 is pressed by the user, the search unit 26 searches for a coordinated function executable with components, with the components input to respective input fields as search conditions.

When plural components are input as search conditions, the search unit 26 may search for a coordinated function executable with all the plural components input as the search conditions, according to an AND condition, or may search for a coordinated function executable with at least one component among the plural components input as the search conditions, according to an OR condition. For example, when components A and B are specified as search conditions, according to an AND condition, the search unit 26 may search for a coordinated function executable with both the components A and B, or according to an OR condition, the search unit 26 may search for a coordinated function executable with the component A, a coordinated function executable with the component B, and a coordinated function executable with the components A and B. When plural components are input to one input field, the search unit 26 may perform retrieval with respect to the plural components according to an AND condition, or perform retrieval according to an OR condition. The AND condition or the OR condition may be determined in advance, or set by the user.

The search unit 26 searches for a coordinated function executable with components as search conditions by referring to a database indicating a correspondence between plural components and a coordinated function executable with the plural components. The search unit 26 may search for a coordinated function matching the search conditions by referring to the coordination management table illustrated in FIG. 3.

The search unit 26 may search for a coordinated function executable with plural components completely matching search conditions, or search for a coordinated function executable with plural components including components specified as search conditions. For example, when components A and B are specified as components as search conditions, the search unit 26 may search for a coordinated function executable with only the components A and B, or search for a coordinated function executable with plural components (e.g., components A, B, and C) including the components A and B.

When an excludable component is input, the search unit 26 searches for a coordinated function executable without the excludable component. For example, when a component A is specified as an excludable component, the search unit 26 searches for a coordinated function executable without the component A.

The display controller 24 may cause the display to display an image associated with a component input by the user or an image associated with an excludable component. For example, when a character string indicating a multifunction machine α is input to an input field, the display controller 24 may cause the screen to display an image associated with the multifunction machine α (e.g., an icon). To each input field, a character string indicating each component or an excludable component may be input, or an image associated with each component or an excludable component may be input.

Figure 5:
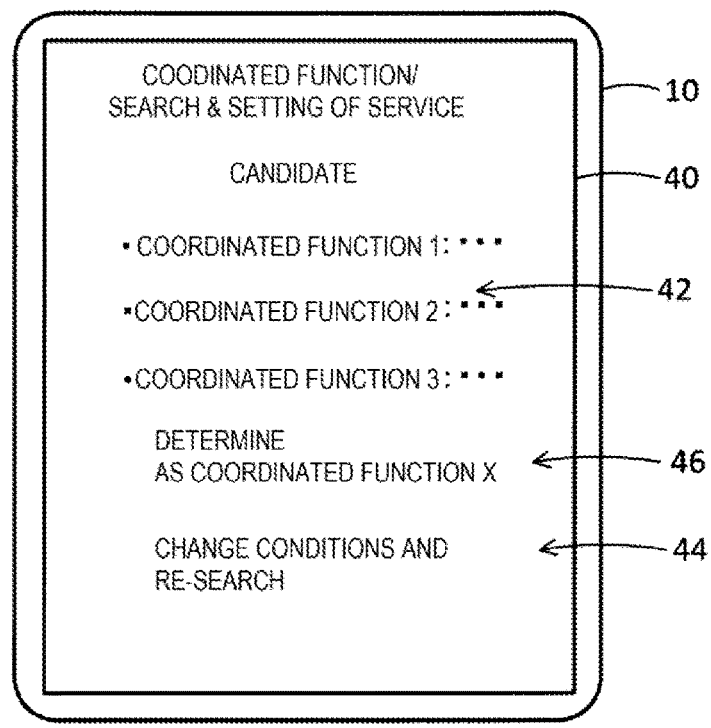
FIG. 5 is a view illustrating a screen.

The display controller 24 causes the display to display a coordinated function retrieved by the search unit 26. FIG. 5 illustrates a screen 40 on which the search result is displayed. The display controller 24 causes the display to display the screen 40 and to display the result of search by the search unit 26 on the screen 40. In the example illustrated in FIG. 5, as indicated by an arrow 42, coordinated functions 1, 8, and 9 are retrieved as candidates of a coordinated function, and these information pieces are displayed on the screen 40. The display controller 24 may also cause the screen 40 to display, side by side, pieces of information indicating the coordinated functions in order of descending the number of components matching search conditions.

For example, it is assumed that as components as search conditions, a multifunction machine α, an OCR software AAA, ledger creation software BBB, and an accounting file A are specified. All of these are identified by unique names. The search unit 26 searches for a coordinated function with these as search conditions, according to an AND condition or an OR condition.

The user may change conditions to search for a coordinated function again. For example, when the user presses a re-search button 44, the display controller 24 causes the display to display the screen 28 illustrated in FIG. 4, instead of the screen 40. The user may search for a coordinated function according to new search conditions by changing components as search conditions on the screen 28, adding a new component, or deleting a component. The search unit 26 searches for a coordinated function according to the new search conditions, and the display controller 24 causes the screen 40 illustrated in FIG. 5 to display the search result.

The search unit 26 may search for a coordinated function executable with similar components similar to components input as search conditions. For example, the search unit 26 searches for a coordinated function executable with a component similar to the multifunction machine α (e.g., a separate multifunction machine having a function which is the same as or similar to that of the multifunction machine α). Likewise, the search unit 26 searches for a coordinated function executable with a component similar to the OCR software AAA (e.g., separate OCR software having a function which is the same as or similar to that of the OCR software AAA), and searches for a coordinated function executable with a component similar to the ledger creation software BBB (e.g., separate ledger creation software having a function which is the same as or similar to that of the ledger creation software BBB). The search unit 26 searches for a coordinated function executable with an accounting file other than the accounting file A. The search unit 26 may search for a coordinated function executable with similar components compatible with components as search conditions. The search unit 26 may search for at least one of a coordinated function executable with components input as search conditions or a coordinated function executable with similar components. The search target may be determined in advance, or may be set by the user. When a coordinated function executable with components input as search conditions is not retrieved, the search unit 26 may search for a coordinated function executable with similar components.

In the above described example, all search conditions are identified by unique names, but the whole or part of search conditions may be identified by generic names. In this case, the search unit 26 searches for a coordinated function executable with components identified by the generic names.

Figure 6:
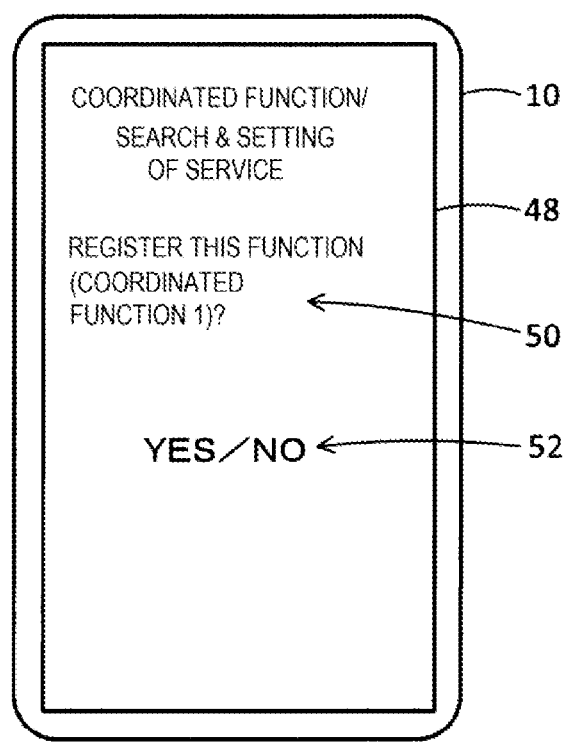
FIG. 6 is a view illustrating a screen.

When the user selects a coordinated function among search results on the screen 40 and presses a determination button 46, the display controller 24 causes the display to display a screen for use in registering the selected coordinated function. FIG. 6 illustrates a screen 48 for the registration. When the determination button 46 is pressed on the screen 40, the display controller 24 causes the display to display the screen 48, instead of the screen 40. On the screen 48, as indicated by a reference numeral 50, a message is displayed inquiring the user about whether to register the coordinated function selected by the user. For example, the coordinated function 1 has been selected by the user, and a message for inquiring about the necessity or unnecessity of the registration of the coordinated function 1 is displayed. On the screen 48, as indicated by a reference numeral 52, a YES button and a NO button are displayed. When the user presses the YES button, the controller 22 registers the coordinated function 1 in information for managing registered coordinated function (e.g., a registered coordinated function management table). When the user presses the NO button, the coordinated function 1 is not registered. In this case, for example, the display controller 24 may cause the display to display the screen 40 illustrated in FIG. 5, instead of the screen 48.

Figure 7:
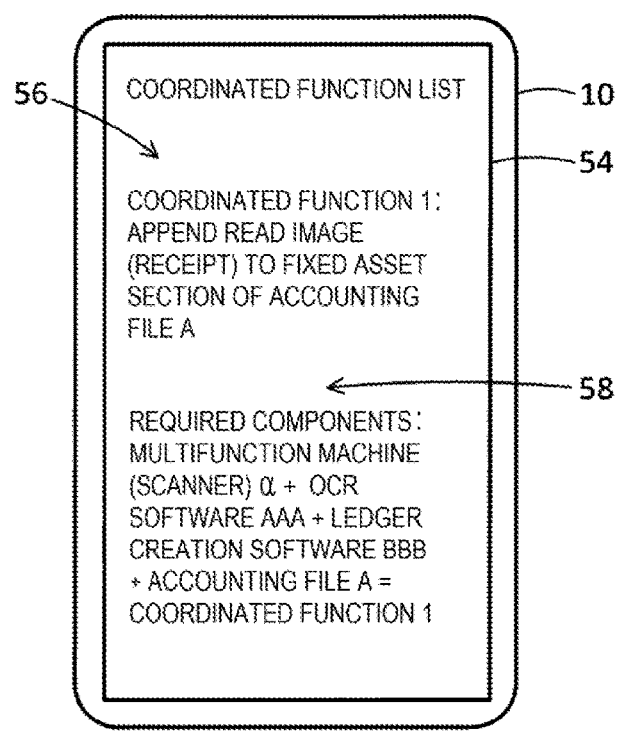
FIG. 7 is a view illustrating a screen.

When the user presses the YES button on the screen 48, the display controller 24 causes the display to display a screen indicating registered coordinated function, instead of the screen 48. FIG. 7 illustrates a screen 54. The display controller 24 causes the screen 54 to display information 56 indicating contents of the coordinated function 1 to be registered, and information 58 indicating components required for executing the coordinated function 1.

The registered coordinated function management table may be, for example, stored in the storage unit 20, or stored in an external device such as the device 12 or the server 14. The controller 22 registers an ID of the coordinated function 1 to be registered, information indicating required components (the multifunction machine α, the OCR software AAA, the ledger creation software BBB or the accounting file A), and information indicating contents of the coordinated function 1, in the registered coordinated function management table. The coordinated function management table illustrated in FIG. 3 may be used as the registered coordinated function management table. In this case, the controller 22 registers an ID of the coordinated function 1, information indicating required components, and information indicating contents of the coordinated function 1, in the coordinated function management table.

The user may partially change required components on the screen 54. That is, the controller 22 changes (edits) components required for executing a coordinated function according to a change operation of the components by the user. For example, when the user changes the multifunction machine α to a separate device by operating the UI unit 18, the search unit 26 searches for a coordinated function executable with the separate device. The display controller 24 causes the screen 40 illustrated in FIG. 5 to display the search result. As described above, components may be changed on the screen for registration so that a new coordinated function may be created.

As described above, according to the present exemplary embodiment, the user inputs components required for a coordinated function so that a coordinated function executable with the components may be notified to the user.

Figure 8:
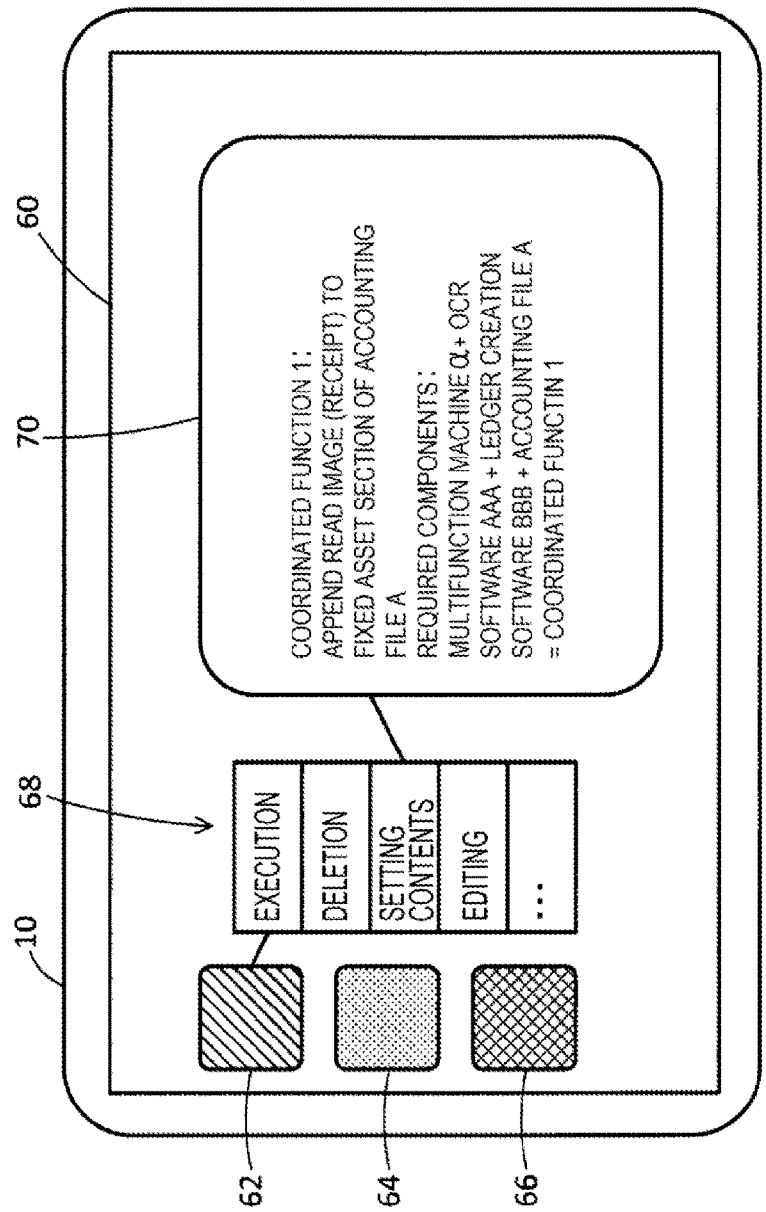
FIG. 8 is a view illustrating a screen.

Hereinafter, a processing after the registration of a coordinated function will be described in detail with reference to FIG. 8. FIG. 8 illustrates a screen 60 displayed on the display of the UI unit 18. The screen 60 may be a so-called desktop screen, a main menu screen, or a screen on which an image associated with application software is displayed. When a coordinated function is created as described above, the display controller 24 creates an image associated with the coordinated function (hereinafter, referred to as a "coordinated function image"), and causes the screen 60 to display the coordinated function image. In the example illustrated in FIG. 8, coordinated function images 62, 64, and 66 are displayed on the screen 60. The coordinated function image 62 is an image associated with the coordinated function 1 created as described above (e.g., an icon or a shortcut icon), and corresponds to an example of instruction information which allows the user to give an instruction for execution of the coordinated function 1. The coordinated function images 64 and 66 are images associated with separate coordinated functions, respectively. When the user specifies the coordinated function image 62 by using the UI unit 18, thereby giving an instruction for execution of the coordinated function 1 (e.g., when a double click operation is performed on the coordinated function image 62), the controller 22 controls the execution of the coordinated function 1. Specifically, the controller 22 instructs the multifunction machine α to scan a document (a receipt), a character string is extracted by the OCR software AAA from an image generated through the scanning, and the character string is added by the ledger creation software BBB to the accounting file A. A processing by each software piece may be performed in the terminal device 10, or performed in an external device such as a device or the server 14.

In the case where all components for executing the coordinated function 1 are identified by unique names, when an instruction for execution of the coordinated function 1 is given, the coordinated function 1 is executed by using plural components identified by the unique names. For example, when the multifunction machine α, the OCR software AAA, the ledger creation software BBB, and the accounting file A are specified as components required for the coordinated function 1, the coordinated function 1 is executed using these components. Meanwhile, in the case where the components are identified by common names, a screen for inputting information for specifying the components specifically is displayed when an instruction for execution of the coordinated function 1 is given. When the user inputs specific names of the components (e.g., unique names), the coordinated function 1 is executed using the components identified by the names. In description with the above described example, when a multifunction machine as a type of a device is specified as the component required for the coordinated function 1, a screen is displayed inquiring the user about the specific multifunction machine at the time of execution of the coordinated function 1. When the user specifies the multifunction machine α as the specific multifunction machine, a part of contents of the coordinated function 1 (e.g., scanning) is executed by the multifunction machine α.

When the user gives an instruction for display of a menu by using the UI unit 18 and specifying the coordinated function image 62 (e.g., when the coordinated function image 62 is specified, and for example, a right clicking operation is performed), the display controller 24 causes the screen 60 to display a menu 68. The display controller 24 may also cause the screen 60 to display the menu 68 in association with the coordinated function image 62 as an operation target. Various commands are displayed on the menu 68, and the user may specify a command displayed on the menu 68 to give an instruction for execution of a processing associated with the command. For example, on the menu 68, an execution command for giving an instruction for execution of the coordinated function 1, a deletion command for giving a deletion instruction of the coordinated function image 62, a setting content command for giving an instruction for display of setting contents of the coordinated function 1, and an editing command for giving an instruction for editing the coordinated function 1 are displayed. In addition, commands other than these may be included in the menu 68.

For example, when the user specifies the setting content command by using the UI unit 18, the display controller 24 causes the screen 60 to display the setting contents of the coordinated function 1, as information on the coordinated function 1. For example, the display controller 24 causes the screen 60 to display a display area 70 and to display the setting contents of the coordinated function 1 within the display area 70. Within the display area 70, the contents of the coordinated function 1, and the components required for executing the coordinated function 1 are displayed. For example, character strings indicating the contents and the required components of the coordinated function 1 are displayed.

When the user specifies the execution command by using the UI unit 18, the controller 22 controls the execution of the coordinated function 1. When the user specifies the deletion command, the controller 22 deletes the coordinated function image 62 from the screen 60. When the user specifies the editing command, the controller 22 executes an editing mode of the coordinated function 1. In the editing mode, the user may give an editing instruction of the contents or components of the coordinated function 1 by using the UI unit 18. The controller 22 edits the contents or components of the coordinated function 1 according to the editing instruction.

Figure 9:
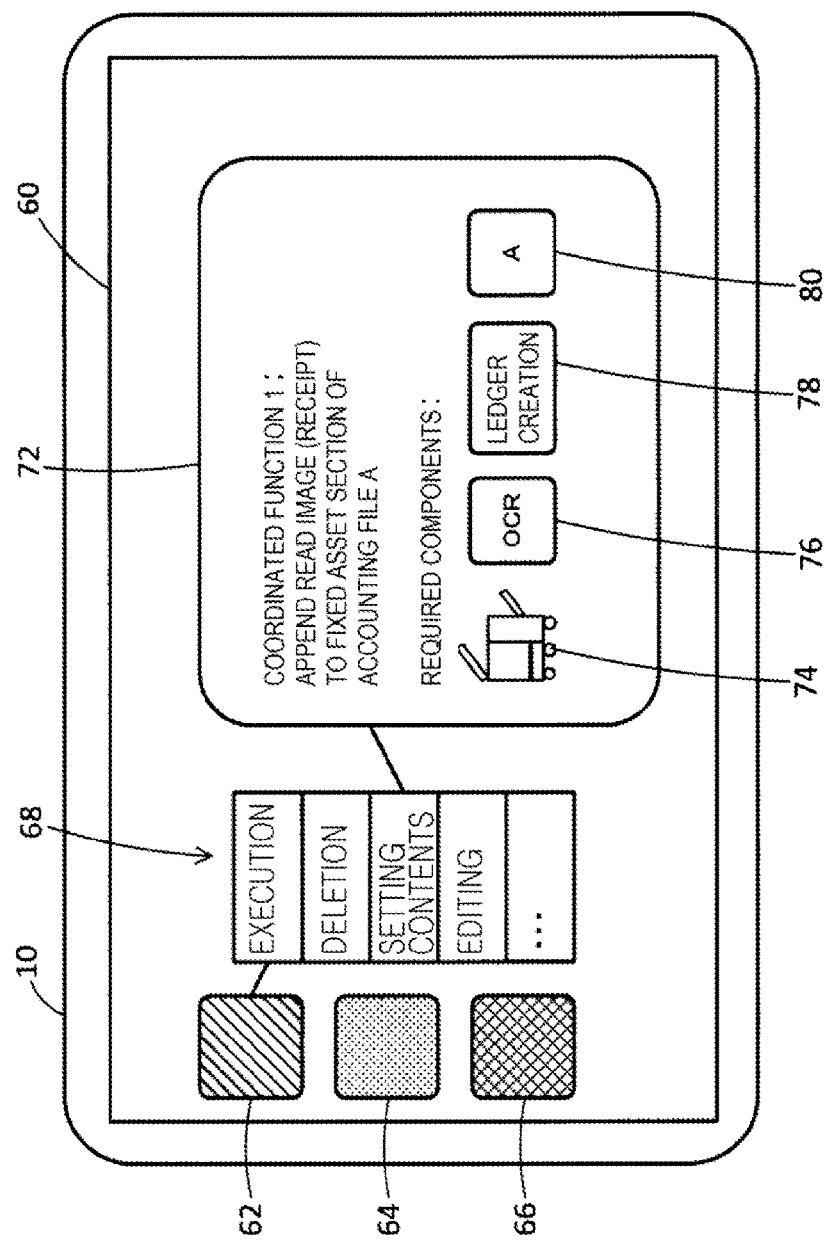
FIG. 9 is a view illustrating a screen.

FIG. 9 illustrates another display example of the setting contents. When the setting content command within the menu 68 is specified by the user, the display controller 24 causes the screen 60 to display a display area 72 and to display the setting contents of the coordinated function 1 within the display area 72. The display controller 24 allows display of a character string indicating the contents of the coordinated function 1, and an image associated with the components required for executing the coordinated function 1 (hereinafter, referred to as a "component image"), within the display area 72. Specifically, component images 74, 76, 78, and 80 are displayed within the display area 72. The component image 74 is an image associated with the multifunction machine α, and may be, for example, an image imitating the multifunction machine α (e.g., an icon), or an appearance image of the multifunction machine α. The component image 76 is an image associated with the OCR software AAA (e.g., an icon). The component image 78 is an image associated with the ledger creation software BBB (e.g., an icon). The component image 80 is an image associated with the accounting file A (e.g., an icon). It can be said that each of the component images 74, 76, 78, and 80 is an image associated with a component which is input by the user and accepted by the controller 22. Since the component images are displayed, information of the components required for the coordinated function may be visually notified to the user. Together with the component images, character strings indicating the components may be displayed.

Figure 10:
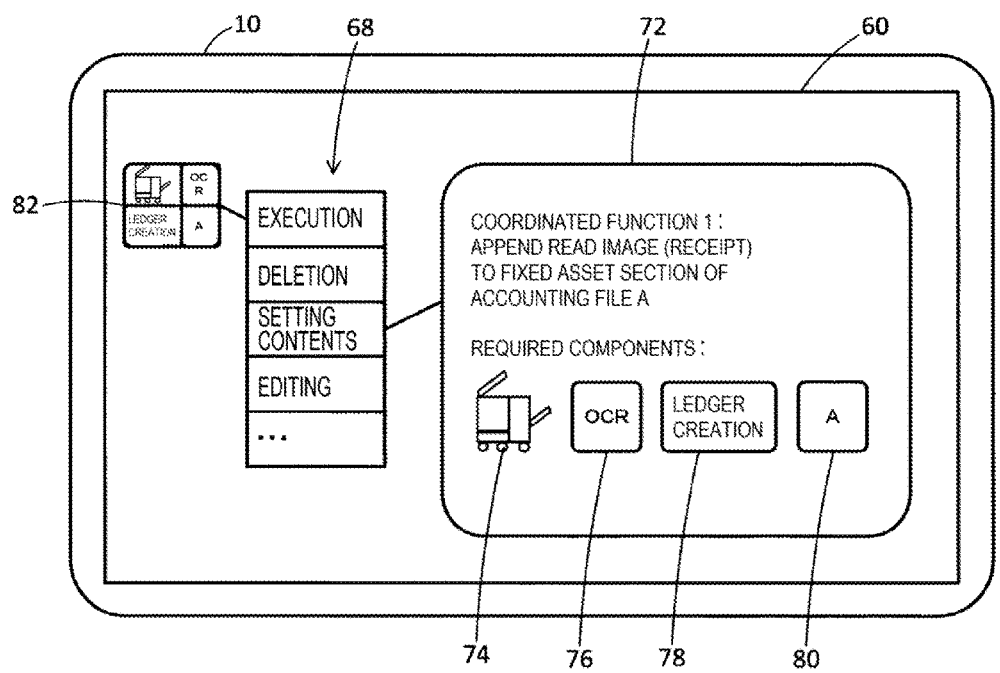
FIG. 10 is a view illustrating a screen.

FIG. 10 illustrates another display example of the coordinated function image. A coordinated function image 82 is an image associated with the coordinated function 1, and is displayed on the screen 60 as in the examples illustrated in FIGS. 8 and 9. The coordinated function image 82 is, for example, a set of component images associated with the components required for executing the coordinated function 1. Specifically, the coordinated function image 82 includes a component image associated with the multifunction machine α, a component image associated with the OCR software AAA, a component image associated with the ledger creation software BBB, and a component image associated with the accounting file A. Within the coordinated function image 82, the respective component images may be arranged so as not to overlap with each other, or arranged so as to partially overlap with each other. The respective component images may be arranged according to the order of use of the respective components. As in the examples illustrated in FIGS. 8 to 10, when the user gives a display instruction of a menu by specifying the coordinated function image 82 by using the UI unit 18, the display controller 24 causes the screen 60 to display the menu 68. On the display area 72 of the setting contents, component images associated with the required components may be displayed, character strings indicating the required components may be displayed, or both the component images and the character strings may be displayed. The coordinated function image is expressed by a set of the component images so that information of the components required for the coordinated function associated with the coordinated function image may be visually notified to the user.

Figure 11:
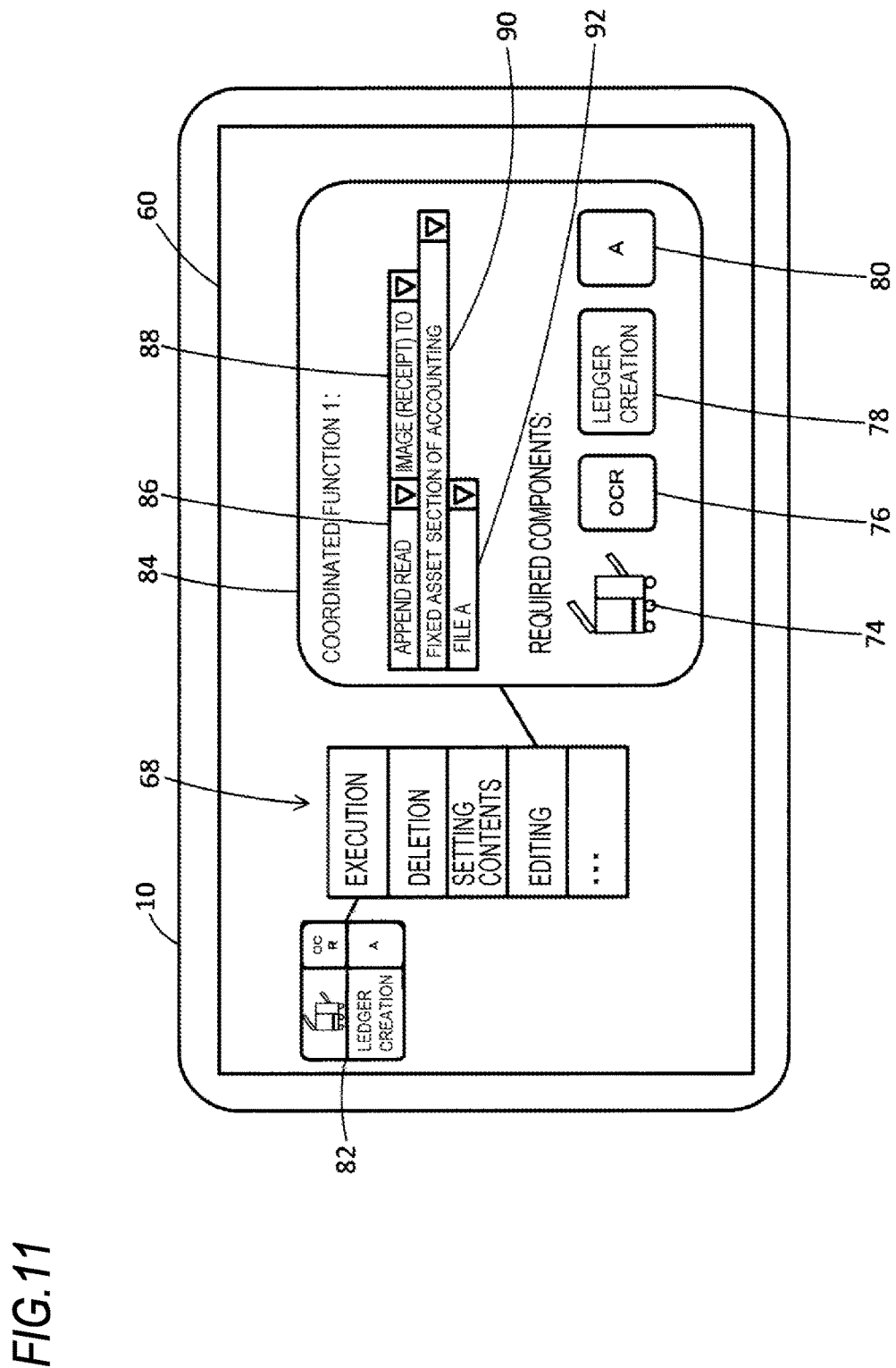
FIG. 11 is a view illustrating a screen.

Hereinafter, the editing mode of the coordinated function will be described in detail. FIG. 11 illustrates the screen 60. The coordinated function image 82 including plural component images is displayed on the screen 60. When the user specifies the editing command on the menu 68 by using the UI unit 18, the display controller 24 causes the screen 60 to display a display area 84 for editing. The display controller 24 allows display of a character string indicating the contents of the coordinated function 1 within the display area 84 for editing, and divides the character string indicating the contents into plural items 86, 88, 90, and 92 according to the components required for the coordinated function 1. The user may change the contents of the coordinated function by changing the contents defined in each item. For example, in the item 86, a processing "read" is defined. The user may edit (change) the coordinated function by changing the processing "read" to another component. The search unit 26 searches for a coordinated function executable with the other component and the already selected component. The display controller 24 causes the screen 60 to display information indicating the coordinated function as the search result.

Figure 12:
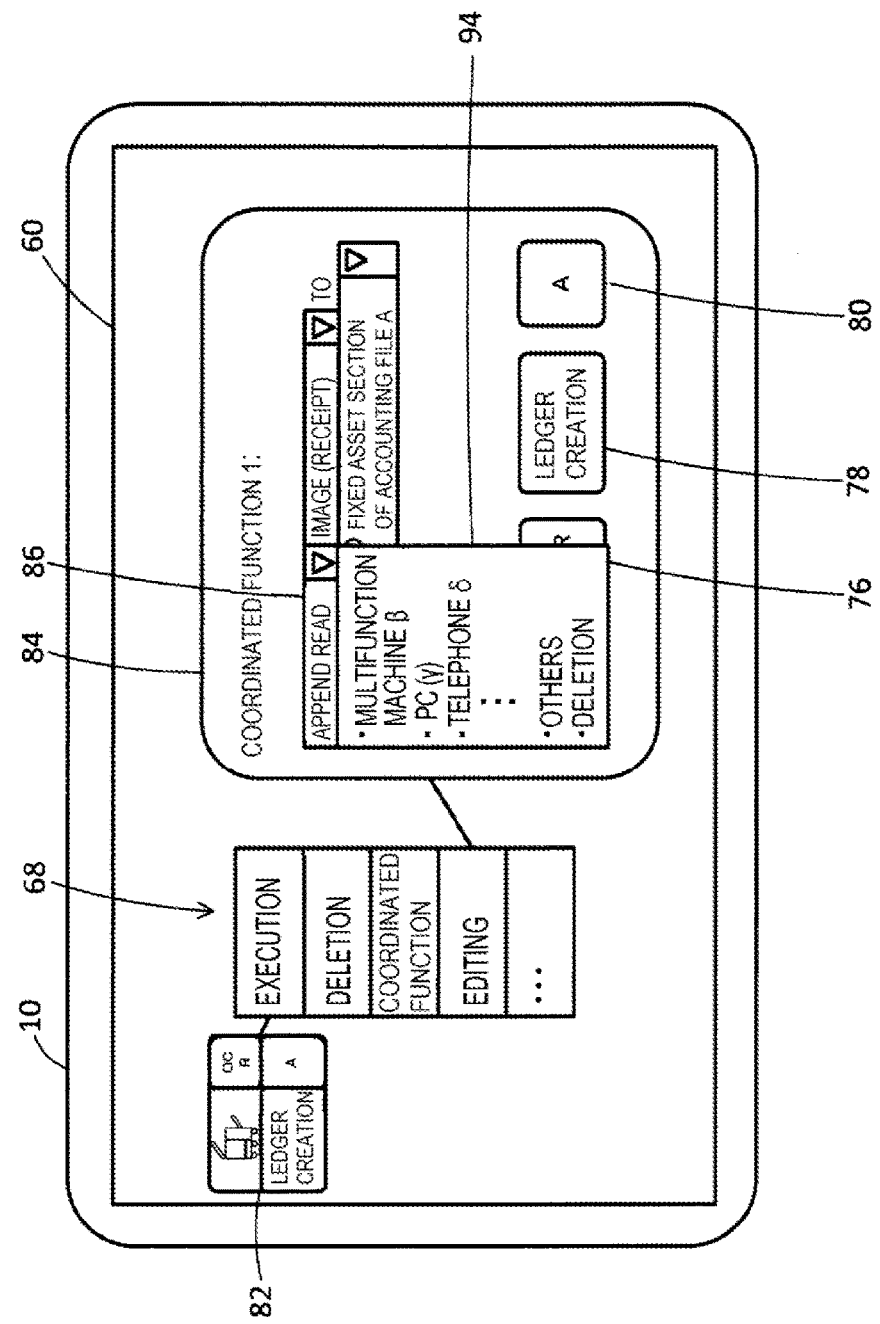
FIG. 12 is a view illustrating a screen.

For example, when the user specifies an item by using the UI unit 18, the display controller 24 causes the screen 60 to display a list of component candidates according to the pull-down format. For example, as illustrated in FIG. 12, when the user specifies the item 86, the display controller 24 causes the screen 60 to display a candidate field 94 in which a list of component candidates is displayed. The processing "read" is processing to be executed by the multifunction machine α as a device, and thus, the display controller 24 allows display of a list of devices (e.g., a multifunction machine β, a PC γ, and a telephone δ) in the candidate field 94. In addition, the display controller 24 may allow display of a list of software or targets as components other than devices, within the candidate field 94. The user may change (edit) the coordinated function by selecting a device in the candidate field 94. The search unit 26 searches for a coordinated function executable with the device and other components which have already been selected, and the display controller 24 causes the display to display information indicating the retrieved coordinated function. The user may specify another component not displayed in the candidate field 94, delete a part of contents of the coordinated function, or delete (exclude) a component required for the coordinated function.

In a separate example, the display controller 24 may allow display of character strings indicating processing candidates or target candidates to be executed by a component, within the candidate field 94. The user may change (edit) the coordinated function by selecting a processing or a target from the list of processing candidates or the list of target candidates. The search unit 26 searches for a coordinated function executable with the processing or target selected by the user and other selected components, while searching for components required for executing the coordinated function. The display controller 24 causes the screen 60 to display information indicating the retrieved coordinated function, while causing the screen 60 to display information indicating the retrieved components.

The display controller 24 may allow display of component candidates capable of making possible the coordinated function in association with (in combination with) other selected components, within the candidate field 94, while not allowing display of all component candidates within the candidate field 94. Such component candidates are retrieved by the search unit 26. For example, when the user specifies the item 86, the display controller 24 allows display of component candidates capable of making possible the coordinated function in association with (in combination with) the components (the OCR software AAA, the ledger creation software BBB, and the accounting file A), other than the multifunction machine α executing the processing "read," within the candidate field 94. For example, when the components capable of executing the coordinated function in association with (in combination with) the OCR software AAA, the ledger creation software BBB, and the accounting file A are a multifunction machine β and a PC γ other than the multifunction machine α, the display controller 24 allows display of information on the multifunction machine β and the PC γ within the candidate field 94. More specifically, the search unit 26 searches for components (e.g., the multifunction machine β and the PC γ) capable of executing the coordinated function in association with (in combination with) the OCR software AAA, the ledger creation software BBB, and the accounting file A, and the display controller 24 allows display of the search result within the candidate field 94.

When the component used for the coordinated function is changed, the display controller 24 changes the component image included in the coordinated function image 82 into a component image associated with the changed component according to the change of the component. For example, when the multifunction machine α is changed to the PC γ, the display controller 24 changes the component image associated with the multifunction machine α included in the coordinated function image 82 into a component image associated with the PC γ.

The contents defined in other items may also be changed as in the item 86. For example, when the contents "accounting file A" defined in the item 90 are changed to another accounting file Aa, the contents of the coordinated function 1 are changed to a processing "append a read image (a receipt) to a fixed asset item of the accounting file Aa."

Figure 13:
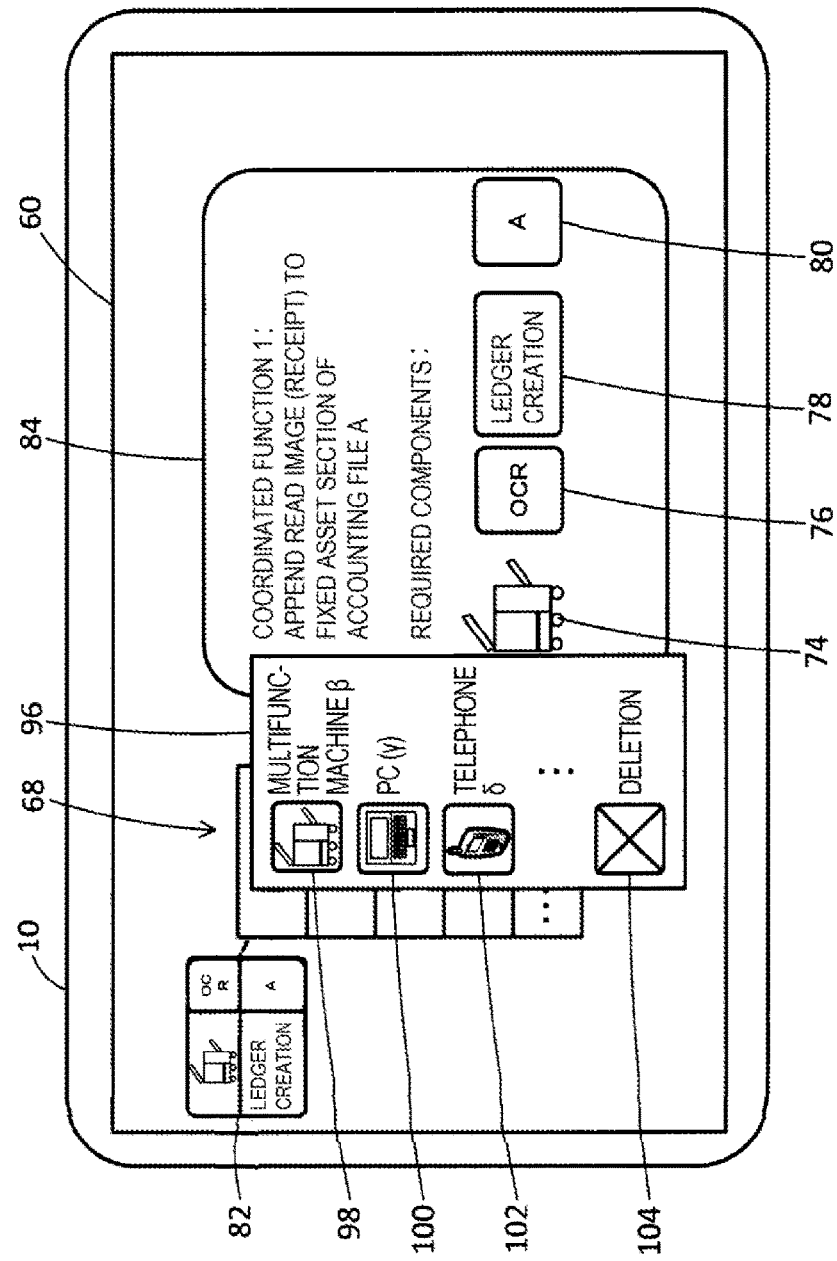
FIG. 13 is a view illustrating a screen.

FIG. 13 illustrates another editing example. The user may change a component used for a coordinated function by changing a component image displayed within the display area 84 for editing into another component image, and thus, change (edit) the coordinated function. For example, when the user specifies the component image 74 associated with the multifunction machine α by using the UI unit 18, the display controller 24 causes the screen 60 to display a candidate field 96 indicating a list of component candidates. The display controller 24 allows display of, for example, images associated with component candidates (hereinafter, referred to as "candidate images") within the candidate field 96. In addition, the display controller 24 may allow display of character strings indicating components together with component images within the candidate field 96, or may allow display of only character strings within the candidate field 96 without allowing display of component images. Since the multifunction machine α associated with the component image 74 specified by the user is a device, the display controller 24 allows display of candidate images 98, 100, 102, . . . associated with device candidates within the candidate field 96. The candidate image 98 is an image associated with a multifunction machine (e.g., the multifunction machine β), the candidate image 100 is an image associated with a PC (e.g., the PC γ), and the candidate image 102 is an image associated with a telephone (e.g., the telephone δ). The display controller 24 may allow display of candidate images associated with software or target candidates, as component candidates other than devices, within the candidate field 94.

When the user selects a candidate image in the candidate field 96, the display controller 24 allows display of the selected candidate image as a component image within the display area 72 instead of the component image 74 being displayed within the display area 84 for editing. The search unit 26 searches for a coordinated function executable with a component associated with the selected candidate image and other selected components, and the display controller 24 causes the screen 60 to display information on the retrieved coordinated function. For example, when the user selects the candidate image 100 associated with the PC γ, the display controller 24 allows display of the candidate image 100 associated with the PC γ as a component image within the display area 84 for editing, instead of the component image 74 associated with the multifunction machine α. The search unit 26 searches for a coordinated function executable with the PC γ, the OCR software AAA, the ledger creation software BBB, and the accounting file A, and the display controller 24 causes the screen 60 to display information on the retrieved coordinated function. Other components may be changed in the same manner.

The display controller 24 may allow display of an image 104 for an instruction for deletion (exclusion) of a component within the candidate field 96. When the image 104 is specified by the user, the selected multifunction machine α is excluded from a component group used for the coordinated function. In this case, the search unit 26 searches for a coordinated function executable with the remaining components, and the display controller 24 causes the screen 60 to display information on the retrieved coordinated function.

The display controller 24 may allow display of candidate images associated with component candidates capable of making possible a coordinated function in association with (in combination with) other selected components within the candidate field 96 while not allowing display of candidate images associated with all component candidates within the candidate field 96. Such component candidates are retrieved by the search unit 26. For example, when the user specifies the component image 74 associated with the multifunction machine α, as a change target, the display controller 24 allows display of candidate images associated with component candidates capable of executing the coordinated function in association with (in combination with) the components (the OCR software AAA, the ledger creation software BBB, and the accounting file A) other than the multifunction machine α, within the candidate field 96. When such component candidates are the multifunction machine β and the PC γ, the display controller 24 allows display of the candidate image 98 associated with the multifunction machine β, and the candidate image 100 associated with the PC γ within the candidate field 96.

When a component is selected in the candidate field 96, and the component used for the coordinated function is changed, the display controller 24 changes the component image included in the coordinated function image 82 into a component image associated with the changed component according to the change of the component.

As described above, through a simple operation of selecting a candidate image in the candidate field 96, a coordinated function and a component may be changed (edited).

When the coordinated function or the component is changed (edited), the controller 22 changes registered contents of the coordinated function according to the editing, in a registered coordinated function management table (for example, the coordinated function management table illustrated in FIG. 3). For example, when the multifunction machine α used for the coordinated function 1 is changed to another component, and the contents of the coordinated function 1 are changed, the controller 22 changes the multifunction machine α associated with the coordinated function 1 into another corresponding component, and changes the contents of the coordinated function 1 in the registered coordinated function management table. Accordingly, instead of the coordinated function 1 before the change, the coordinated function 1 after the change is registered in the registered coordinated function management table. In this case, the coordinated function 1 before the change is not registered in the registered coordinated function management table. The controller 22 may maintain the state where the coordinated function 1 before the change is registered in the registered coordinated function management table, while registering the coordinated function 1 after the change as a new coordinated function in the registered coordinated function management table, apart from the coordinated function 1 before the change. In this case, each of the coordinated function 1 before the change and the coordinated function 1 after the change are registered in the registered coordinated function management table.

Figure 14:
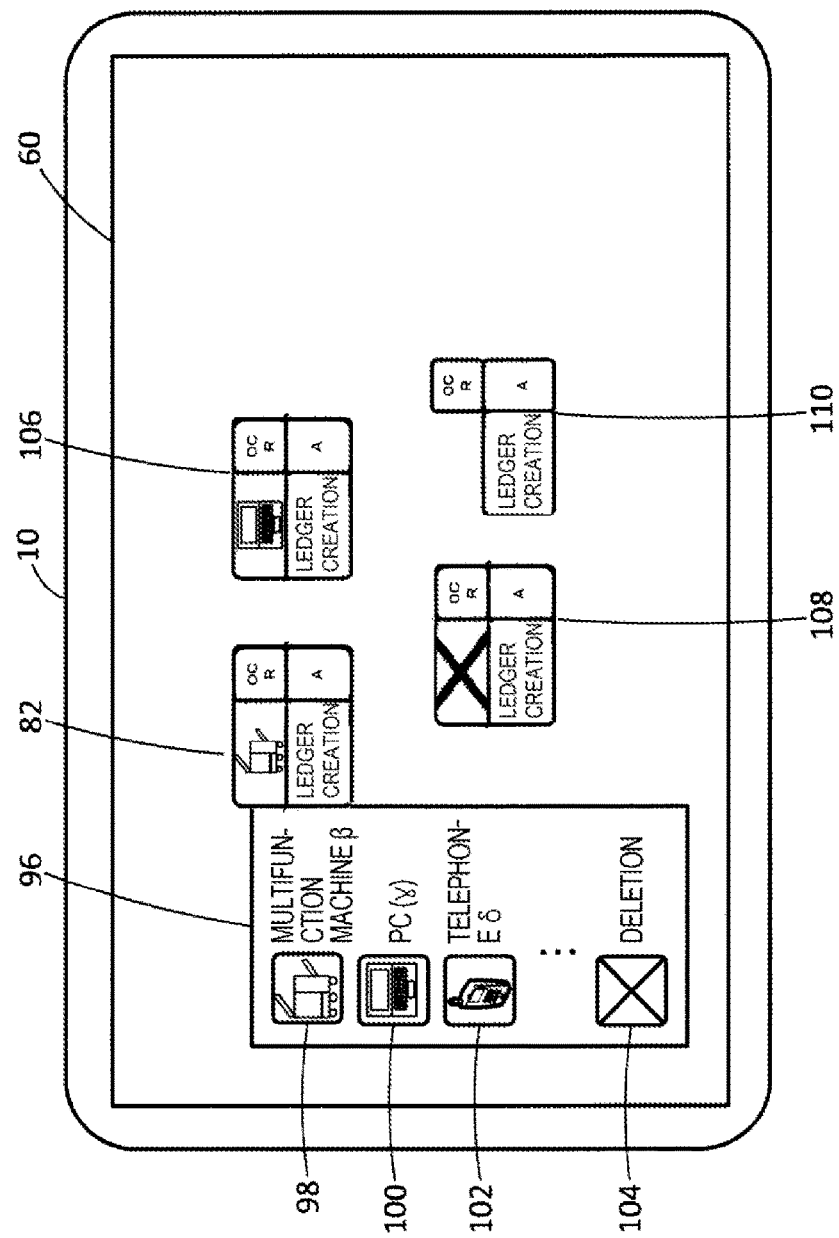
FIG. 14 is a view illustrating a screen.

FIG. 14 illustrates another editing example. For example, when the user specifies a component image associated with the multifunction machine α included in the coordinated function image 82 by using the UI unit 18, and gives an instruction for display of a component candidate field (e.g., a predetermined operation is made to display the candidate field), the display controller 24 causes the screen 60 to display the candidate field 96 associated with the coordinated function image 82. When the user selects a candidate image in the candidate field 96, the search unit 26 searches for a coordinated function executable with a component associated with the selected candidate image and other selected components, and the display controller 24 causes the screen 60 to display information on the retrieved coordinated function.

As described with reference to FIG. 13, the display controller 24 changes a component image included in the coordinated function image 82 into a component image associated with a changed component according to a change of the component. For example, when the multifunction machine α is changed into the PC γ, the display controller 24 uses the candidate image 100 associated with the PC γ as a component image of the PC γ, and thus, changes a component image associated with the multifunction machine α included in the coordinated function image 82, into the candidate image 100. A coordinated function image 106 is an image created in this manner. The coordinated function image 106 includes the component image associated with the PC γ, instead of the component image associated with the multifunction machine α.

After the coordinated function 1 or the component associated with the coordinated function image 82 is edited, and the coordinated function 1 after the change is registered in the registered coordinated function management table, when the coordinated function 1 before the change is not registered in the registered coordinated function management table, the display controller 24 does not causes the screen 60 to display the coordinated function image 82, but causes the screen 60 to display the coordinated function image 106 after the change. It is possible to keep the state where the coordinated function 1 before the change is registered in the registered coordinated function management table, while the coordinated function 1 after the change may be registered in the registered coordinated function management table, as a new coordinated function separate from the coordinated function 1 before the change. In this case, the display controller 24 causes the screen 60 to display the coordinated function image 82 associated with the coordinated function 1 before the change, and the coordinated function image 106 associated with the coordinated function 1 after the change.

When the user gives an instruction for execution of a coordinated function by using the UI unit 18 and specifying the coordinated function image 106, the controller 22 controls the execution of the coordinated function associated with the coordinated function image 106.

FIG. 14 illustrates another coordinated function image. A coordinated function image 108 is an image associated with a coordinated function in a state where the multifunction machine α is excluded from a component group required for the coordinated function 1, and includes an image associated with deletion of a component instead of a component image associated with the multifunction machine α. The coordinated function associated with the coordinated function image 108 is a function executable with the OCR software AAA, the ledger creation software BBB, and the accounting file A. A coordinated function image 110 is also an image associated with a coordinated function in a state where the multifunction machine α is excluded from a component group required for the coordinated function 1. The coordinated function image 110 is an image which does not include a component image associated with the excluded multifunction machine α. The coordinated function associated with the coordinated function image 110 is the same as the coordinated function associated with the coordinated function image 108.

As described above, it is possible to change a coordinated function image according to a change of a coordinated function or a component, so that the change of the component may be visually notified to the user.

Figure 15:
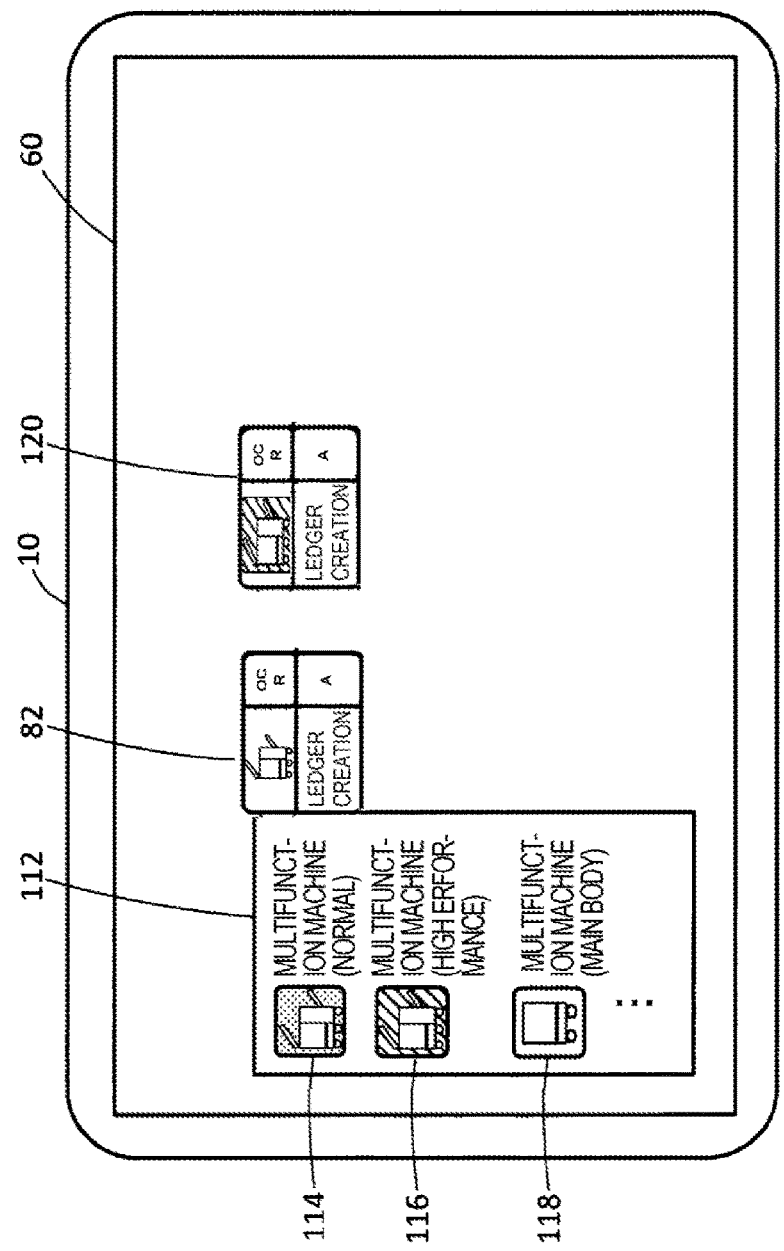
FIG. 15 is a view illustrating a screen.

When a performance of a coordinated function is changed, the display controller 24 may change a coordinated function image associated with the coordinated function into an image indicating the changed performance. For example, when a performance of a component required for a coordinated function is changed, a performance of the coordinated function is changed. Hereinafter, this processing will be described in detail with reference to FIG. 15. For example, when the user gives a performance change instruction of a component (the multifunction machine α) by specifying a component image associated with the multifunction machine α included in the coordinated function image 82 by using the UI unit 18, the display controller 24 causes the screen 60 to display a candidate field 112 in association with the coordinated function image 82. In the candidate field 112, images associated with performance candidates of the multifunction machine α (candidate images 114, 116, 118, . . . ) are displayed. The candidate image 114 is an image associated with a normal performance. The candidate image 116 an image associated with a high performance. The high performance is, for example, a performance higher than a normal performance, in a scanning resolution, a scanning speed, a printing resolution, a printing speed, a copying resolution, a copying speed, and a data transmission speed. The high performance may be a performance by which a color image forming function is available, and the normal performance may be a performance by which a color image forming function is unavailable. The candidate image 114 representing the normal performance and the candidate image 116 representing the high performance are composed of different images, respectively. The candidate image 118 is an image associated with a main body portion included in the multifunction machine. That is, functions are allocated to portions of the multifunction machine, respectively, and the candidate image 118 is an image associated with a function allocated to the main body portion. For example, a printing function is allocated to the main body portion, and the candidate image 118 is an image associated with the printing function of the multifunction machine. For example, when the performance of the multifunction machine α is changed into a high performance associated with the candidate image 116, the display controller 24 uses the candidate image 116 as a high performance component image to change the component image associated with multifunction machine α included in the coordinated function image 82 into the candidate image 116. A coordinated function image 120 is an image created in this manner. The coordinated function image 120 includes a component image indicating a high performance, as a component image associated with the multifunction machine α.

The performance of the coordinated function associated with the coordinated function image 120 is higher than the performance of the coordinated function associated with the coordinated function image 82. For example, a scanning speed by the coordinated function associated with the coordinated function image 120 is higher than a scanning speed by the coordinated function associated with the coordinated function image 82.

A component image may be an image schematically representing the performance associated with the component image. For example, the component image may be an image representing the degree of the performance. Specifically, a component image associated with a multifunction machine having a high processing speed or a high operation speed may be an image representing a state where a processing or an operation is fast, and a component image associated with a multifunction machine having a low processing speed or a low operation speed may be an image representing a state where a processing or an operation is slow. For example, when a processing speed or an operation speed of a coordinated function changes from a normal speed to a high speed, the display controller 24 changes a component image representing the normal speed included in the coordinated function image into a component image representing the high speed.

A component image or a candidate image may be a still image or a moving image. For example, a component image or a candidate image associated with a multifunction machine having a high processing speed or a high operation speed may be a moving image representing a state where a processing or an operation is fast.

As described above, by using a component image representing a performance, the performance of a coordinated function may be visually notified to the user. When the performance of a coordinated function is changed, the change of the performance of the coordinated function may be visually notified to the user.

Hereinafter, another exemplary embodiment will be described.

The user may input information indicating a processing that the user wants to execute as a coordinated function, and information indicating plural components required for the coordinated function (the processing) to the terminal device 10 by using the UI unit 18. The controller 22 functions as an accepting unit to accept contents input by the user. When the coordinated function input by the user is executable by the plural components input by the user, the controller 22 controls notification of the coordinated function. Specifically, the search unit 26 searches for the coordinated function (the processing) input by the user, and determines whether the retrieved coordinated function is executable by the plural components input by the user. That is, the search unit 26 determines whether plural components required for the retrieved coordinated function (the input coordinated function) match the plural components input by the user. More specifically, the search unit 26 searches for the coordinated function (the processing) input by the user in a database indicating a correspondence between plural components and a coordinated function executable by the plural components, and determines whether plural components associated with the retrieved coordinated function match the plural components input by the user. When the plural components associated with the retrieved coordinated function match the plural components input by the user, the display controller 24 controls the displaying of the coordinated function. Hereinafter, this processing will be described in more detail.

Figure 16:
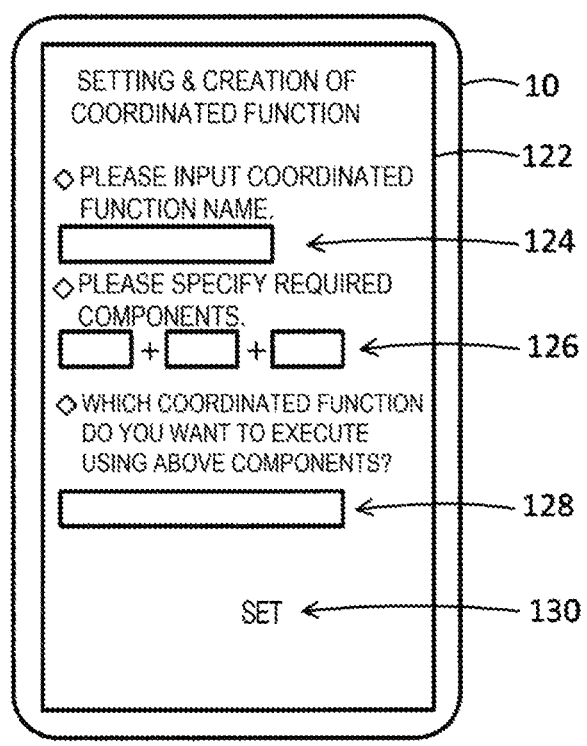
FIG. 16 is a view illustrating a screen.

FIG. 16 illustrates a screen 122 displayed when a coordinated function is set (created). The screen 122 is a screen on which a coordinated function is to be set (created). The display controller 24 causes the display of the UI unit 18 to display the screen 122 according to the user's instruction for display of the screen 122, and causes the screen 122 to display an input field to which information for setting a coordinated function is input. On the screen 122, for example, input fields 124, 126, and 128 are displayed.

The input field 124 is a field to which a name of a coordinated function is input. The input field 126 is a field to which a component used for the coordinated function is input. The input field 128 is a field to which contents of the coordinated function are input. That is, contents (a processing) of a coordinated function that the user wants to execute are input to the input field 128, components required for executing the coordinated function (components assumed by the user) are input to the input field 126, and a name to be attached to the coordinated function is input to the input field 124. The user may directly input the name, the components, or the contents of the coordinated function to each input field by using the UI unit 18, or select the name, the components, or the contents of the coordinated function from an information list displayed in a pull-down format in each input field. The controller 22 accepts information input to each input field. As information indicating a component, a unique name of the component may be input, or a common name of the component may be input.

Figure 17:
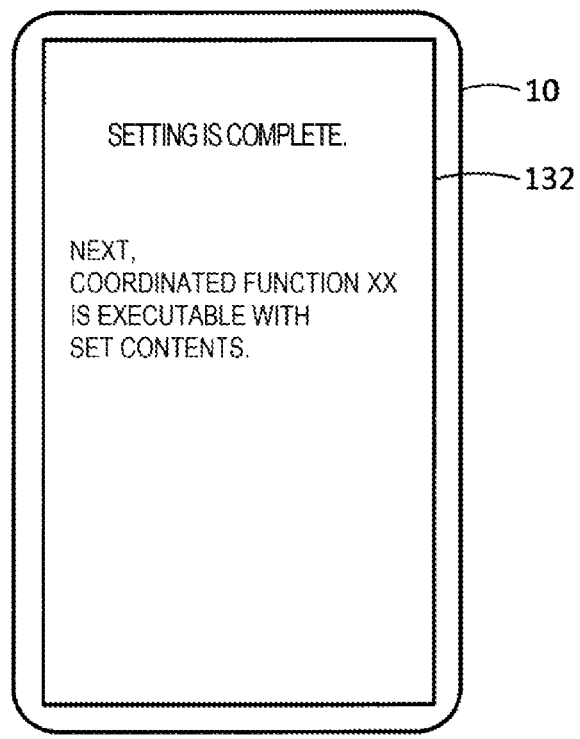
FIG. 17 is a view illustrating a screen.

When a setting button 130 is pressed by the user, the search unit 26 searches for the contents of the coordinated function input to the input field 128 in a database indicating a correspondence between plural components and a coordinated function executable by the plural components. Next, the search unit 26 determines whether plural components associated with the retrieved coordinated function in the database match the plural components input to the input field 126. When the plural components associated with the retrieved coordinated function match the plural components input to the input field 126, the display controller 24 causes the display to display information indicating that the setting of the coordinated function has been completed. For example, as illustrated in FIG. 17, the display controller 24 causes the display to display a screen 132, and causes the screen 132 to display information indicating that the setting of the coordinated function has been completed. In this case, the controller 22 registers the coordinated function input to the input field 128 in a registered coordinated function management table (e.g., the coordinated function management table illustrated in FIG. 3). Here, the controller 22 associates the name input to the input field 124 with the coordinated function. The display controller 24 creates a coordinated function image associated with the coordinated function, and causes the display to display the coordinated function image. When the user gives an instruction for execution of the coordinated function by specifying the coordinated function image, the controller 22 controls the execution of the coordinated function associated with the coordinated function image.

The controller 22 may estimate a component or contents of a coordinated function from information input to each input field by using a technique such as artificial intelligence (AI) or machine learning.

Figure 18:
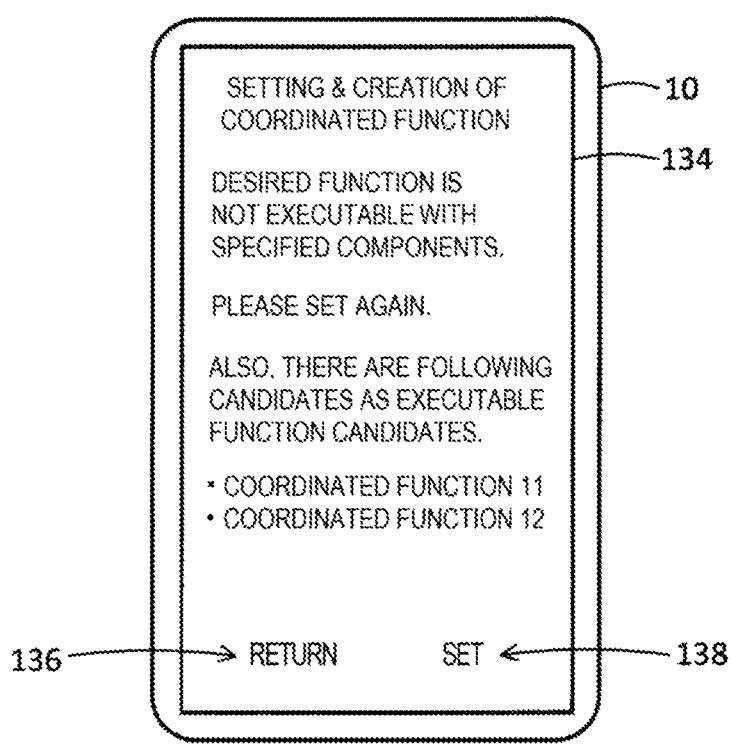
FIG. 18 is a view illustrating a screen.

When the coordinated function input to the input field 128 is not executable according to the plural components input to the input field 126, that is, when the plural components associated with the retrieved coordinated function in the database do not match the plural components input to the input field 126, the display controller 24 causes the display to display information indicating that the input coordinated function is not executable. For example, as illustrated in FIG. 18, the display controller 24 may cause the display to display a screen 134, and causes the screen 134 to display information indicating that the coordinated function (the processing) specified by the user is not executable with the components specified by the user.

When the user presses a return button 136 on the screen 134, the display controller 24 causes the display to display, instead of the screen 134, the screen 122 illustrated in FIG. 16.

The search unit 26 may search for candidates of other coordinated functions executable with the plural components input to the input field 126, and the display controller 24 may cause the screen 134 to display the search result. As such candidates of coordinated functions, the coordinated functions 11 and 12 are retrieved, and information indicating these functions is displayed on the screen 134. When the user selects a desired candidate (e.g., the coordinated function 11) from a candidate group of coordinated functions, and presses a setting button 138, the controller 22 registers the selected coordinated function candidate in the registered coordinated function management table. The display controller 24 creates a coordinated function image associated with the coordinated function, and causes the display to display the coordinated function image.

According to the above-described processing, when a coordinated function input by the user (a processing the user wants to execute) is executable by plural components input by the user, the coordinated function is created and registered. Thereafter, the user may execute the coordinated function. When a coordinated function input by the user is not executable by plural components input by the user, a coordinated function executable with the plural components may be provided to the user.

Figure 19:
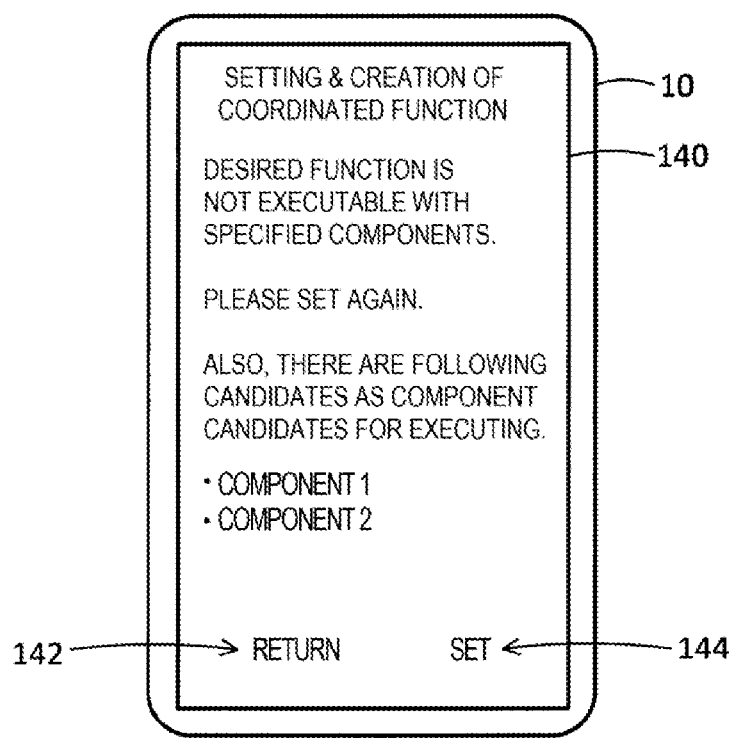
FIG. 19 is a view illustrating a screen.

According to the plural components input to the input field 126, when the coordinated function input to the input field 128 is not executable, the display controller 24 may cause the display to display a separate screen. FIG. 19 illustrates such a screen 140. The display controller 24 causes the screen 140 to display information indicating that the input coordinated function is not executable, and simultaneously, causes the screen 140 to display information indicating components required for executing the coordinated function input to the input field 128. More specifically, the search unit 26 searches for the coordinated function input to the input field 128 in a database, and searches for plural components associated with the coordinated function. The display controller 24 causes the screen 140 to display information indicating these plural components. For example, components 1 and 2 are displayed as components required for executing the coordinated function.

When the user presses a return button 142 on the screen 140, the display controller 24 causes the display to display, instead of the screen 140, the screen 122 illustrated in FIG. 16. When the user inputs the components 1 and 2, instead of the existing components, to the input field 126 within the screen 122, and presses the setting button 130, it is possible to execute the coordinated function input to the input field 128 by the components 1 and 2. Thus, the display controller 24 may cause the display to display the screen 132 indicating that the setting of the coordinated function has been completed (see FIG. 17). In this manner, information indicating components required for executing a coordinated function input by the user is displayed, and thus, it is possible to urge the user to input components for executing the coordinated function.

When the user presses a setting button 144 on the screen 140, the controller 22 registers a coordinated function executable with the components 1 and 2 (this coordinated function is the same as the coordinated function input to the input field 128), in the registered coordinated function management table. A coordinated function image associated with the coordinated function is created and displayed.

When the contents of a coordinated function input by the user are not specified due to, for example, an unclearness, the controller 22 may perform a processing of urging the user to input information for specifying the contents of the coordinated function. For example, the search unit 26 analyzes information (e.g., a character string) input to the input field 128 illustrated in FIG. 16, thereby specifying (identifying) the contents of the coordinated function input by the user. In the specifying processing, a related known technology (e.g., a natural language processing or a morphological analysis) is used. When the contents of the coordinated function input by the user are not specified through the analysis, the search unit 26 estimates the contents of the coordinated function based on the information input to the input field 128. For example, the search unit 26 may search for a coordinated function having contents including a part or whole of information input to the input field 128 (e.g., information indicating processing contents), or search for a coordinated function having contents including a word whose meaning is the same as or similar to a word input to the input field 128, in a database indicating a correspondence between plural components and a coordinated function executable with the plural components. The display controller 24 causes the display to display the search result as a result of estimation of the contents of the coordinated function.

Figure 20:
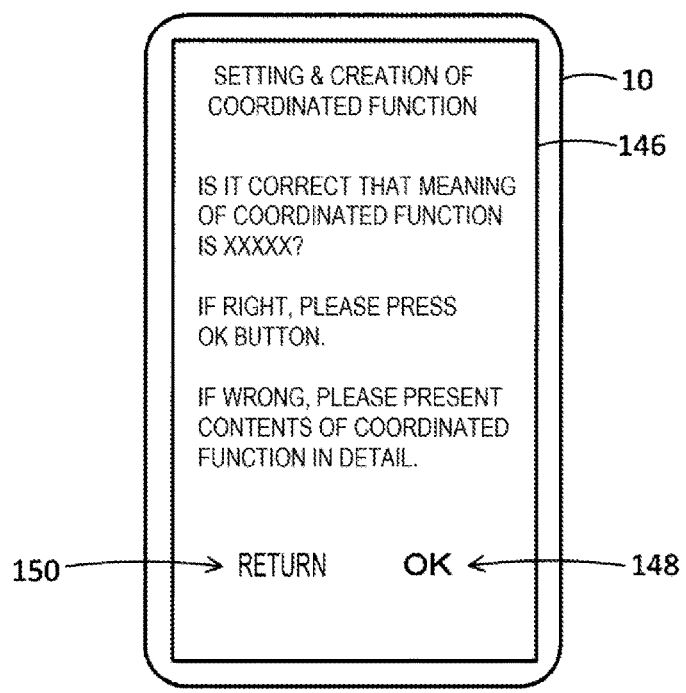
FIG. 20 is a view illustrating a screen.

For example, as illustrated in FIG. 20, the display controller 24 causes the display to display a screen 146, instead of the screen 122 illustrated in FIG. 16, and causes the screen 146 to display a result of estimation of the coordinated function contents (e.g., a character string "Is it correct that the meaning of a coordinated function is XXXXX?"). When the user presses an OK button 148, the search unit 26 identifies the contents of the estimation result as the contents input to the input field 128 illustrated in FIG. 16 and determines whether a coordinated function as the contents of the estimation result is executable by the plural components input by the user. Following processings are the same as those described with reference to FIGS. 17 to 19. Meanwhile, when the user presses a return button 150, the display controller 24 causes the display to display, instead of the screen 146, the screen 122 illustrated in FIG. 16. In this case, the user inputs information to each input field within the screen 122. Following processings are the same as those described with reference to FIGS. 17 to 20. As described above, when the contents input by the user are not specifiable due to, for example, an unclearness, it is possible to estimate the contents and inquire of the user about the contents so as to more specifically specify a processing the user wants to execute.

The above-described terminal device 10 is, for example, implemented by a cooperation of hardware and software. Specifically, the terminal device 10 includes one or plural processors such as a CPU (not illustrated). When the one or plural processors read and execute a program stored in a storage device (not illustrated), a function of each unit of the terminal device 10 is implemented. The program is stored in the storage device via a recording medium such as a CD or a DVD, or via a communication path such as a network. As a separate example, each unit of the terminal device 10 may be, for example, implemented by hardware resources such as a processor, an electronic circuit, or an application specific integrated circuit (ASIC). In the implementation, a device such as a memory may be used. As another example, each unit of a terminal device may be implemented by, for example, a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a hardware controller configured to:
   control a user interface to display a plurality of input fields to which a plurality of components are inputted;
   accept components required for a coordinated function according to the components inputted to the input fields, wherein the coordinated function is a cooperation of the components;
   perform a retrieval with respect to the accepted components to determine an executable coordinated function that is executable with the accepted components;
   control notification of an executable coordinated function according to contents accepted by the hardware controller; and
   control notification of at least one of a coordinated function executable with the components or a coordinated function executable with similar components that are similar to the components.

2. The information processing apparatus according to claim 1, wherein
   the hardware controller controls notification of a coordinated function executable with the similar components when a coordinated function executable with the components is not retrieved.

3. The information processing apparatus according to claim 1, wherein
   the hardware controller further accepts an excludable component that is not for use for the coordinated function, and the hardware controller controls notification of a coordinated function executable without the excludable component.

4. The information processing apparatus according to claim 1, wherein
   the hardware controller further controls notification of an executable coordinated function according to contents accepted by the hardware controller after notification of the coordinated function.

5. The information processing apparatus according to claim 1, wherein
   the hardware controller further controls registration of the executable coordinated function.

6. The information processing apparatus according to claim 5, wherein
   the hardware controller further edits a registered coordinated function according to operation by a user.

7. The information processing apparatus according to claim 1, wherein
   the hardware controller further causes a display to display instruction information that allows a user to give an instruction for execution of the executable coordinated function.

8. The information processing apparatus according to claim 7, wherein
   the hardware controller causes the display to display information on the executable coordinated function, according to operation by the user on the instruction information.

9. The information processing apparatus according to claim 1, wherein
   the components include a device, a specific portion of a device, software, a specific function of software, a collective function including a plurality of functions, or the coordinated function.

10. A non-transitory computer readable medium storing a program causing a computer to execute information processing, the information processing comprising:
    controlling a user interface to display a plurality of input fields to which a plurality of components are inputted;
    accepting components required for a coordinated function according to the components inputted to the input fields, wherein the coordinated function is a cooperation of the components;
    performing a retrieval with respect to the accepted components to determine an executable coordinated function that is executable with the accepted components;
    controlling notification of an executable coordinated function according to accepted contents; and
    controlling notification of at least one of a coordinated function executable with the components or a coordinated function executable with similar components that are similar to the components.

11. An information processing method comprising:
    controlling a user interface to display a plurality of input fields to which a plurality of components are inputted;
    accepting components required for a coordinated function according to the components inputted to the input fields, wherein the coordinated function is a cooperation of the components;
    performing a retrieval with respect to the accepted components to determine an executable coordinated function that is executable with the accepted components;
    controlling notification of an executable coordinated function according to accepted contents; and
    controlling notification of at least one of a coordinated function executable with the components or a coordinated function executable with similar components that are similar to the components.

* * * * *